US011818325B2

(12) United States Patent
Taylor

(10) Patent No.: US 11,818,325 B2
(45) Date of Patent: *Nov. 14, 2023

(54) BLENDED MODE THREE DIMENSIONAL DISPLAY SYSTEMS AND METHODS

(71) Applicant: MAGIC LEAP, INC., Plantation, FL (US)

(72) Inventor: Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,096

(22) Filed: Jul. 6, 2021

(65) Prior Publication Data

US 2021/0337176 A1 Oct. 28, 2021

Related U.S. Application Data

(63) Continuation of application No. 16/872,792, filed on May 12, 2020, now Pat. No. 11,089,282.

(60) Provisional application No. 62/851,773, filed on May 23, 2019.

(51) Int. Cl.
*H04N 13/156* (2018.01)
*H04N 13/398* (2018.01)
*H04N 13/128* (2018.01)

(52) U.S. Cl.
CPC ......... *H04N 13/156* (2018.05); *H04N 13/128* (2018.05); *H04N 13/398* (2018.05); *H04N 2213/002* (2013.01)

(58) Field of Classification Search
CPC .. H04N 13/156; H04N 13/128; H04N 13/398; H04N 2213/002; H04N 13/344; H04N 13/395; H04N 13/279; H04N 13/122; H04N 2013/0081

USPC .......................................................... 348/54
See application file for complete search history.

(56) References Cited

U.S. PATENT DOCUMENTS

| 5,754,270 A * | 5/1998 | Rehse | G02C 7/042 |
| | | | 351/159.47 |
| 10,616,567 B1 * | 4/2020 | Clemens | G06T 15/20 |
| 11,386,529 B2 | 7/2022 | Taylor | |
| 2006/0056727 A1 | 3/2006 | Jones et al. | |
| 2008/0304013 A1 | 12/2008 | Seo | |
| 2010/0085351 A1 | 4/2010 | Deb et al. | |

(Continued)

OTHER PUBLICATIONS

Foreign OA for CN Patent Appln. No. 202080038034.3 dated Jul. 20, 2022.

(Continued)

*Primary Examiner* — Gims S Philippe
(74) *Attorney, Agent, or Firm* — Vista IP Law Group, LLP

(57) ABSTRACT

A method for displaying a three dimensional ("3D") image includes rendering a frame of 3D image data. The method also includes analyzing the frame of 3D image data to generate depth data. The method further includes using the depth data to segment the 3D image data into i) at least one near frame of two dimensional ("2D") image data corresponding to a near depth, and ii) at least one far frame of 2D image data corresponding to a far depth that is farther than the near depth from a point of view. Moreover, the method includes displaying the near and far frames at the near and far depths respectively. The near and far frames are displayed simultaneously.

19 Claims, 17 Drawing Sheets

(56) References Cited

U.S. PATENT DOCUMENTS

| | | | | |
|---|---|---|---|---|
| 2010/0118127 | A1* | 5/2010 | Nam | H04N 13/122 348/51 |
| 2010/0156897 | A1* | 6/2010 | Blumenthal | H04N 13/10 345/419 |
| 2011/0157155 | A1 | 6/2011 | Turner et al. | |
| 2013/0069942 | A1 | 3/2013 | Woo et al. | |
| 2014/0049536 | A1* | 2/2014 | Neuman | H04N 13/239 345/419 |
| 2014/0313290 | A1* | 10/2014 | Tech | H04N 13/161 348/43 |
| 2014/0375772 | A1* | 12/2014 | Gabara | H04N 13/296 348/47 |
| 2016/0147067 | A1 | 5/2016 | Hua et al. | |
| 2017/0007450 | A1 | 1/2017 | Samec et al. | |
| 2017/0053450 | A1 | 2/2017 | Rodriguez et al. | |
| 2017/0124717 | A1 | 5/2017 | Baruch et al. | |
| 2017/0160798 | A1 | 6/2017 | Lanman et al. | |
| 2017/0316762 | A1 | 11/2017 | El-Ghoroury | |
| 2018/0053284 | A1 | 2/2018 | Rodriguez et al. | |
| 2018/0120573 | A1* | 5/2018 | Ninan | G02B 27/0179 |
| 2018/0137607 | A1 | 5/2018 | Mishma et al. | |
| 2018/0262758 | A1* | 9/2018 | El-Ghoroury | H04N 13/344 |
| 2019/0035165 | A1 | 1/2019 | Gausebeck | |
| 2019/0162950 | A1 | 5/2019 | Lapstun | |
| 2019/0172216 | A1 | 6/2019 | Ninan et al. | |
| 2019/0220089 | A1 | 7/2019 | Kakizawa et al. | |

OTHER PUBLICATIONS

Extended European Search Report for EP Patent Appln. No. 20810449.7 dated Jun. 13, 2022.
Non-Final Office Action for U.S. Appl. No. 16/872,792 dated Dec. 23, 2020.
PCT International Search Report and Written Opinion for International Appln. No. PCT/US20/32459, Applicant Magic Leap, Inc. dated Aug. 6, 2020 (14 pages).
Amendment Response for U.S. Appl. No. 16/872,792 dated Mar. 23, 2021.
Notice of Allowance for U.S. Appl. No. 16/872,792 dated Apr. 5, 2021.
Non-Final Office Action for U.S. Appl. No. 17/110,638 dated Jul. 22, 2021.
Amendment Response to NFOA for U.S. Appl. No. 17/110,638 dated Oct. 20, 2021.
Notice of Allowance for U.S. Appl. No. 17/110,638 dated Nov. 24, 2021.
PCT International Preliminary Report on Patentability for International Appln. No. PCT/US20/32459, Applicant Magic Leap, Inc., dated Nov. 16, 2021 (12 pages).
PCT International Search Report and Written Opinion for International Appln. No. PCT/US20/63068, Applicant Magic Leap, Inc. dated Mar. 3, 2021 (14 pages).
Notice of Allowance for U.S. Appl. No. 17/110,638 dated Mar. 8, 2022.
Extended European Search Report for EP Patent Appln. No. 20897295.0 dated Dec. 21, 2022.
Foreign Response for CN Patent Appln. No. 202080038034.3 dated Nov. 18, 2022.
Foreign NOA for CN Patent Appln. No. 202080038034.3 dated Jan. 11, 2023.
Foreign Response for EP Patent Appln. No. 20810449.7 dated Jan. 2, 2023.
Non-Final Office Action for U.S. Appl. No. 17/805,615 dated Mar. 28, 2023.
Foreign OA for CN Patent Appln. No. 202080084088.3 dated Apr. 18, 2023.
Amendment Response to NFOA for U.S. Appl. No. 17/805,615 dated Jun. 27, 2023.
Non-Final Office Action for U.S. Appl. No. 17/805,615 dated Jul. 13, 2023.
Foreign OA for JP Patent Appln. No. 2021-569068 dated Jul. 26, 2023.
Foreign Response for CN Patent Appln. No. 202080084088.3 dated Aug. 2, 2023.
Foreign NOA for CN Patent Appln. No. 202080084088.3 dated Aug. 25, 2023.

* cited by examiner

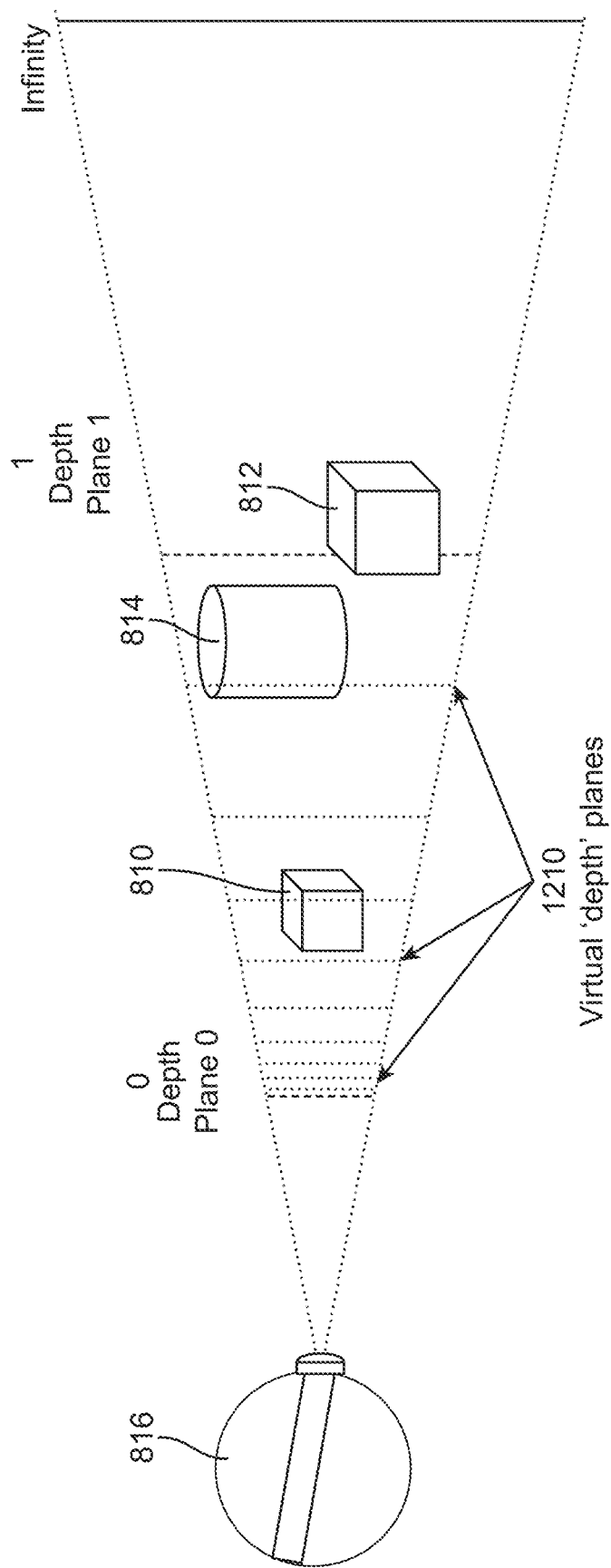

BLENDED MODE THREE DIMENSIONAL DISPLAY SYSTEMS AND METHODS

CROSS-REFERENCE TO RELATED APPLICATIONS

The present application is a continuation of U.S. patent application Ser. No. 16/872,792, filed on May 12, 2020, which claims priority to U.S. Provisional Application Ser. No. 62/851,773, filed on May 23, 2019 and entitled "VIRTUAL, AUGMENTED, AND MIXED REALITY SYSTEMS AND METHODS." The present application is related to U.S. Utility patent application Ser. No. 14/555,585 filed on Nov. 27, 2014 and entitled "VIRTUAL AND AUGMENTED REALITY SYSTEMS AND METHODS," and U.S. Utility patent application Ser. No. 14/738,877 filed on Jun. 13, 2015 and entitled "METHODS AND SYSTEMS FOR CREATING VIRTUAL AND AUGMENTED REALITY." The contents of the aforementioned patent applications are hereby expressly and fully incorporated by reference in their entirety, as though set forth in full. Described in the aforementioned incorporated patent applications are various embodiments of virtual, augmented, and mixed reality systems and methods. Described herein are further embodiments of virtual, augmented, and mixed reality systems and methods.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present disclosure relates to virtual reality, augmented reality, and mixed reality imaging, visualization, and display systems and methods. In particular, the present disclosure relates to virtual reality, augmented reality, and mixed reality imaging, visualization, and display systems and methods for generating a blended display mode.

BACKGROUND

Modern computing and display technologies have facilitated the development of virtual reality (VR), augmented reality (AR), and mixed reality (MR) systems. VR systems create a simulated environment for a user to experience. This can be done by presenting computer-generated imagery to the user through a head-mounted display. This imagery creates a sensory experience which immerses the user in the simulated environment. A VR scenario typically involves presentation of only computer-generated imagery rather than also including actual real-world imagery.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time.

FIG. 1 depicts an example AR/MR scene 2 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 12 flying by which seems to be a personification of a bumble bee, even though these elements 12, 10 are not actually present in the real-world environment.

Various optical systems generate images at various depths for displaying VR, AR, or MR scenarios. Some such optical systems are described in U.S. Utility patent application Ser. No. 14/555,585 filed on Nov. 27, 2014, the contents of which have been previously incorporated by reference herein. Other such optical systems for displaying MR experiences are described in U.S. Utility patent application Ser. No. 14/738,877, the contents of which have been previously incorporated by reference herein.

Because the human visual perception system is complex, it is challenging to produce a VR/AR/MR technology that facilitates a comfortable, natural-feeling, rich presentation of virtual image elements amongst other virtual or real-world imagery elements. Three dimensional ("3D") image display systems experience the vergence-accommodation conflict problem. This problem occurs when two optical depth related biological processes send conflicting depth signals to a viewer/user's brain. Vergence relates to the tendency of the viewer's eye(s) to rotate to align the optical axis (axes) with an object of the viewer's attention at a distance. In binocular systems, the point at which the optical axes intersect can be called a "point of vergence." The amount of rotation of the viewer's eye(s) during vergence is interpreted by the viewer's brain as an estimated depth. Accommodation relates to the tendency of the lens(es) of the viewer's eye(s) to focus so that an object of the viewer's attention at a distance. The focus of the viewer's eye(s) during vergence is interpreted by the viewer's brain as another estimated depth. When the vergence and accommodation signals are interpreted by the viewer's brain as the same or similar estimated depths, the 3D viewing experience is natural and comfortable for the viewer. On the other hand, when the vergence and accommodation signals are interpreted by the viewer's brain as the substantially different estimated depths, the 3D viewing experience is suboptimal for the viewer, and may result in discomfort (eyestrain, headaches, etc.) and fatigue. Such problems are known as vergence-accommodation conflict.

Portable VR/AR/MR system have limitations such as size and portability issues, battery life issues, system overheating issues, processing power, memory, bandwidth, data sources, component latency, and other system and optical challenges, which can negatively impact VR/AR/MR system performance. These limitations elevate the importance of 3D image rendering for natural vergence and accommodation.

Improved systems and techniques are needed for processing image data and displaying images, including, for example, systems and techniques for rendering and displaying 3D images to viewers/users while minimizing vergence-accommodation conflict, and systems and techniques for minimizing demands on limited graphical processing capabilities of portable VR/AR/MR systems while doing so.

Improved systems and techniques are needed for addressing these issues. The systems and methods described herein are configured to address these and other challenges.

What is needed is a technique or techniques to improve over legacy techniques and/or over other considered approaches. Some of the approaches described in this background section are approaches that could be pursued, but not necessarily approaches that have been previously conceived or pursued.

SUMMARY

In one embodiment, a method for displaying a three dimensional ("3D") image in a blended mode includes rendering a frame of 3D image data. The method also includes analyzing the frame of 3D image data to generate depth data. The method further includes using the depth data to segment the 3D image data into i) at least one near frames of two dimensional ("2D") image data corresponding to a near depth, and ii) at least one far frame of 2D image data corresponding to a far depth that is farther than the near depth from a point of view. Moreover, the method includes displaying the near and far frames at the near and far depths respectively. The near and far frames are displayed simultaneously.

In one or more embodiments, the near depth corresponds to about 1.96 diopters, and the far depth may correspond to about 0.67 diopters. The frame of 3D image data may include depth segmentation data, stereo color pair data, and real world mesh data. Analyzing the frame of 3D image data to generate the depth data may include generating a disparity map from the frame of 3D image data, and re-projecting the frame of 3D image data.

In one or more embodiments, using the depth data to segment the 3D image data into the near and far of frames of 2D image data includes identifying a near only set of virtual objects/pixels having respective depths in a near depth range, identifying a far only set of virtual objects/pixels having respective depths in a far depth range, and identifying a near and far overlap set of virtual objects/pixels having respective depths in a middle depth range. Using the depth data to segment the 3D image data into the near and far of frames of 2D image data may also include adding the near only set of virtual objects/pixels to the near frame of 2D image data, adding the far only set of virtual objects/pixels to the far frame of 2D image data, performing a blending analysis on the near and far overlap set of virtual objects/pixels to identify a near overlap set of virtual objects/pixels and a far overlap set of virtual objects/pixels, adding the near overlap set of virtual objects/pixels to the near frame of 2D image data, and adding the far overlap set of virtual objects/pixels to the far frame of 2D image data. Blending analysis may involve a linear interpolation, a non-linear interpolation, and/or a plurality of linear interpolations.

In another embodiment, a method for displaying a three dimensional ("3D") image in a blended mode includes rendering a frame of 3D image data. The method also includes analyzing the frame of 3D image data to generate depth data. The method further includes using the depth data to segment the 3D image data into a plurality of frames of two dimensional ("2D") image data. Moreover, the method includes displaying the plurality of frames. In addition, the plurality of frames includes a left near frame of 2D image data corresponding to a near depth, a left far frame of 2D image data corresponding to a far depth that is farther than the near depth from a point of view, a right near frame of 2D image data corresponding to the near depth, and a right far frame of 2D image data corresponding to the far depth. The left near frame and the left far frame are displayed simultaneously. The right near frame and the right far frame are displayed simultaneously.

In one or more embodiments, the left near frame and the left far frame is displayed to a left eye of a user. The right near frame and the right far frame may be displayed to a right eye of a user.

In one or more embodiments, the left near frame and the right near frame are displayed to a user at a first depth from the user. The left far frame and the right far frame may be displayed to the user at a second depth from the user, the second depth being greater than the first depth. The first and second depths correspond to about 1.96 and about 0.67 diopters respectively. When the left near frame, the left far frame, the right near frame, and the right far frame are displayed to a user, the user may perceive a 3D image. The 3D image may correspond to the frame of 3D image data.

BRIEF DESCRIPTION OF THE DRAWINGS

The drawings described below are for illustration purposes only. The drawings are not intended to limit the scope of the present disclosure. The drawings illustrate the design and utility of various embodiments of the present disclosure. It should be noted that the figures are not drawn to scale and that elements of similar structures or functions are represented by like reference numerals throughout the figures. In order to better appreciate how to obtain the recited and other advantages and objects of various embodiments of the disclosure, a more detailed description of the present disclosure will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

FIG. 12 schematically depicts a 3D image including a plurality of virtual objects in a blended mode display with a plurality of virtual depth planes from a side perspective view.

DETAILED DESCRIPTION

Various embodiments of the disclosure are directed to systems, methods, and articles of manufacture for virtual reality (VR)/augmented reality (AR)/mixed reality (MR) in a single embodiment or in multiple embodiments. Other objects, features, and advantages of the disclosure are described in the detailed description, figures, and claims.

Various embodiments will now be described in detail with reference to the drawings, which are provided as illustrative examples so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Embodiments in accordance with the present disclosure address the problem of implementation of VR/AR/MR systems often rely on combinations of off-the-shelf-components and custom components. In some cases the off-the-shelf components do not possess all of the features or performance characteristics that are needed to implement certain desired aspects of the to-be-deployed VR/AR/MR system. Some embodiments are directed to approaches for adding capabilities and/or repurposing resources to accommodate the desired features or performance characteristics of the to-be-deployed VR/AR/MR system. The accompanying figures and discussions herein present example environments, systems, methods, and computer program products for VR/AR/MR systems.

The head mounted audio-visual display system and 3D image rendering system may be implemented independently of AR/MR systems, but some embodiments below are described in relation to AR/MR systems for illustrative purposes only. The 3D image rendering and display systems described herein may also be used in a similar manner with VR systems.

SUMMARY OF PROBLEMS AND SOLUTIONS

As described above, VR/AR/MR systems have 3D image rendering and display limitations that may lead to vergence-accommodation conflict and associated degradation of the VR/AR/MR experience. VR/AR/MR systems also have limitations such as size and portability, battery life, system overheating, processing power, memory, bandwidth, data sources, component latency, and other system and optical challenges, which can negatively impact VR/AR/MR system performance. These limitations may result in reducing graphical processing and image display demands becoming a countervailing challenge to improving 3D image rendering and display.

Figure 8A:
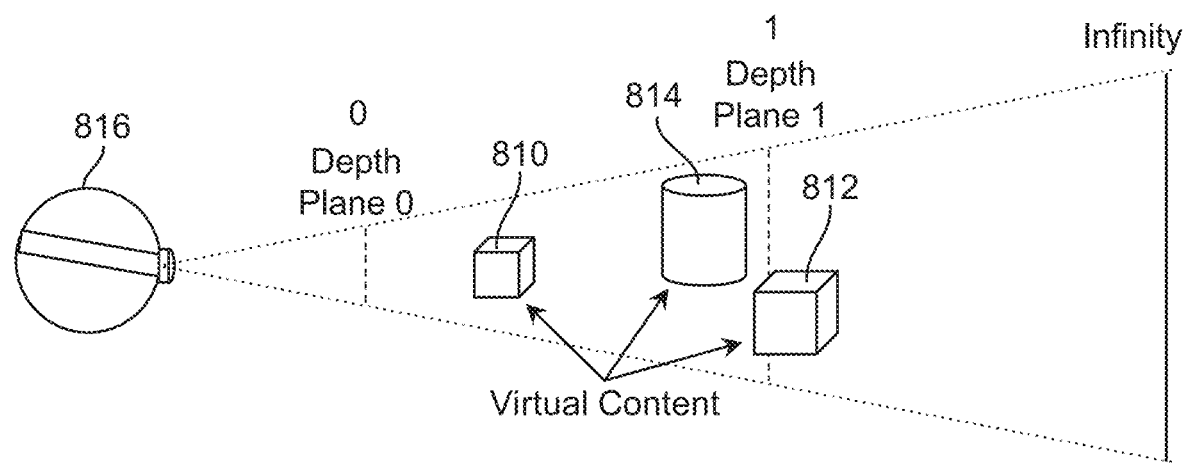
FIGS. 8A and 8B schematically depict a 3D image including a plurality of virtual objects from a side perspective view (FIG. 8A) and a rear perspective view (FIG. 8B) according to some embodiments.
Figure 8B:
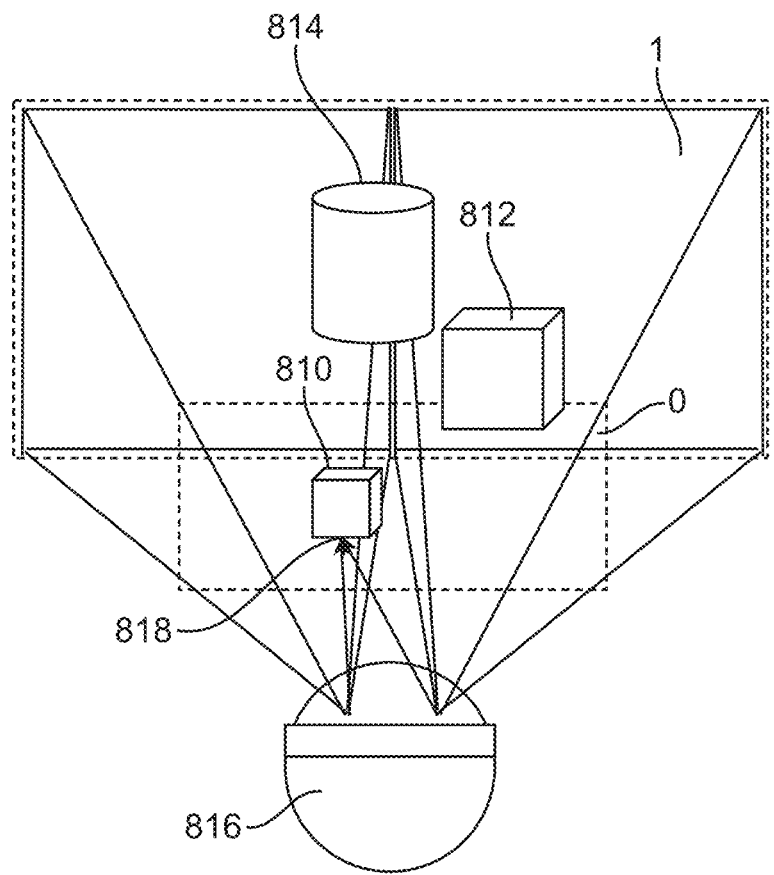
Figure 9A:
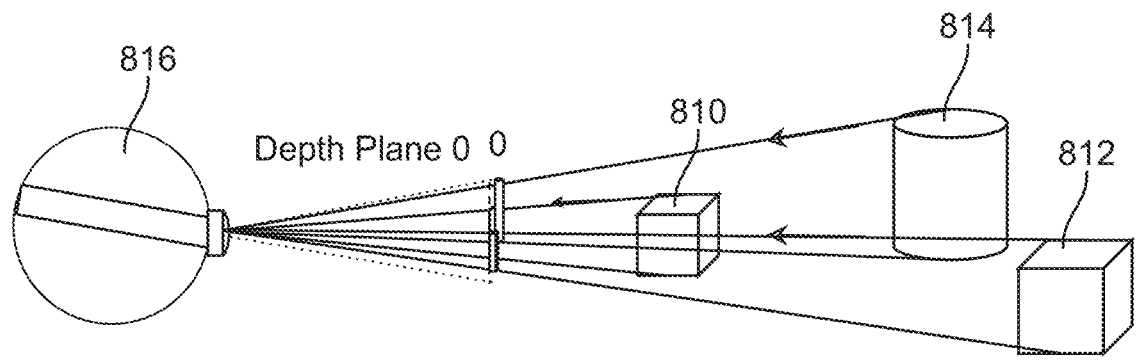
FIGS. 9A and 9B schematically depict a 3D image including a plurality of virtual objects projected onto a single depth plane for display from a side perspective view (FIG. 9A) and a rear perspective view (FIG. 9B).
Figure 9B:
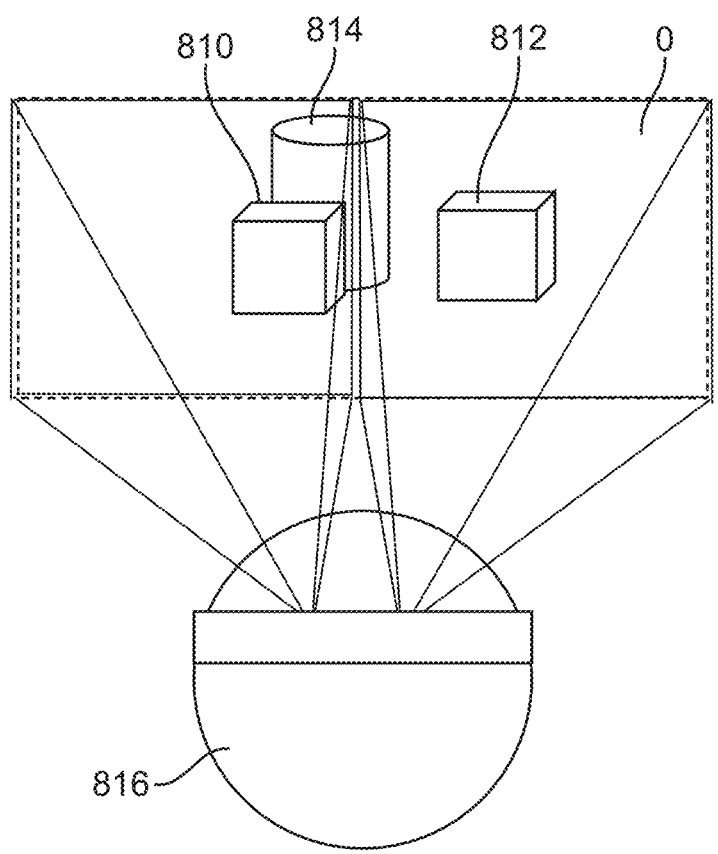

For instance, due to potential graphical processing and size/portability issues, VR/AR/MR systems, especially head worn systems, may only include sufficient components to be able to render and display color images at one depth plane per frame at a minimal frame rate (e.g., 60 Hz) for smooth display of moving virtual objects (i.e., discrete mode). An example of such a VR/AR/MR system operating in discrete mode is shown in FIGS. 8A to 9B. As schematically shown in FIG. 8A, the 3D image includes three virtual objects (near and far cubes 810, 812 and one cylinder 814) adjacent various depth planes (near cube 810 adjacent near depth plane 0 and far cube 812 and cylinder 814 adjacent far depth plane 1). In some embodiments, the near depth plane 0 is at about 1.96 diopters and the far depth plane 1 is at about 0.67 diopters. FIG. 8B is a viewer's perspective view of the 3D image shown in FIG. 8A. In FIG. 8B, tracking the eyes of the viewer/user 816 indicates that the eyes of the viewer verge to a point of vergence 818 coinciding with the location of the near cube 810. In discrete mode, only a single depth plane is illuminated (i.e., image rendered and displayed) per frame. As schematically shown in FIG. 9A, because the point of vergence 818 coincides with the location of the near cube 810, which is adjacent near depth plane 0, all the content of the 3D image (i.e., near and far cubes 810, 812 and cylinder 814) are projected onto near depth plane 0. FIG. 9B is a viewer's perspective view of the 3D image after its content has been projected onto near depth plane 0. Only near depth plane 0 is illuminated, and the eyes of the viewer 816 accommodate to near depth plane 0.

Figure 10A:
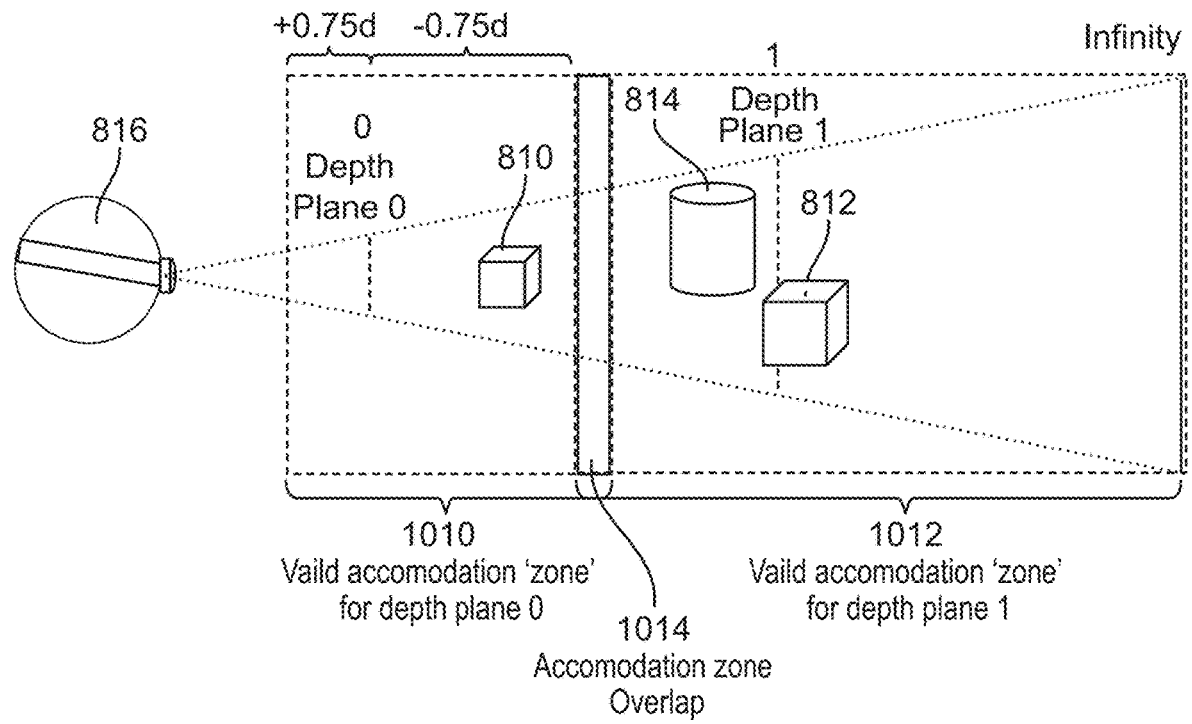
FIG. 10A schematically depicts near and far accommodation zones and an accommodation overlap zone of a dual plane blended mode display system according to some embodiments.
Figure 10B:
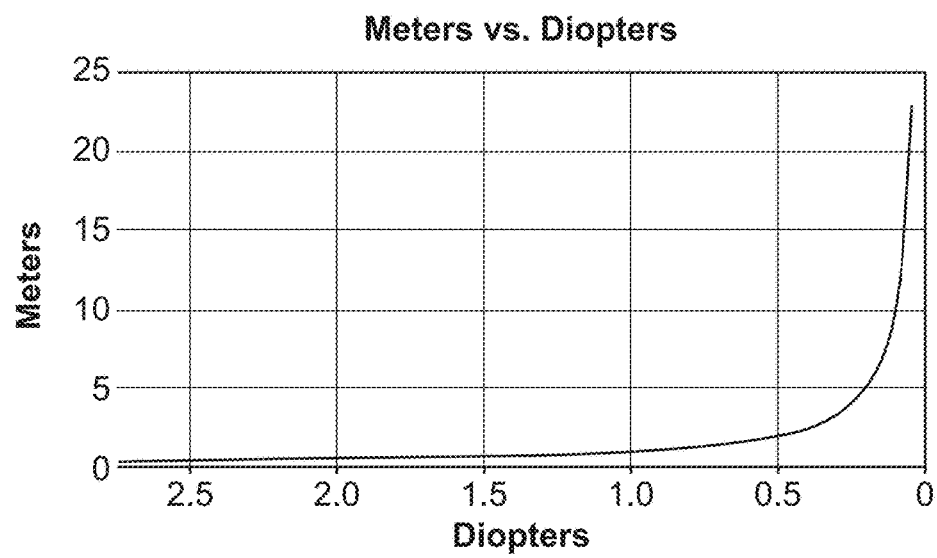
FIG. 10B schematically depicts the relationship between distance from a viewer and diopters.

In some embodiments, projecting all of the content of the 3D image onto a single depth plane only triggers minimal vergence-accommodation conflict (e.g., minimal user discomfort, eyestrain, headaches). This is because there is a loose coupling of accommodation and vergence such that the human brain will tolerate up to about a 0.75 diopter mismatch between accommodation and vergence. As shown in FIG. 10A, this ±0.75 diopter tolerance translates to a near accommodation zone 1010 and a far accommodation zone 1012. Because of the inverse relationship between distance and diopters, as shown in FIG. 10B, the far accommodation zone 1012 is larger than the nearer accommodation zone 1010. With the near depth plane 0 and the far depth plane 1 in the embodiment depicted in FIG. 10A, the ±0.75 diopter tolerance also results in an accommodation zone overlap 1014 where object depths falling in the accommodation zone overlap 1014 may be displayed at either or both the near depth plane 0 and the far depth plane 1, for example, at different scales, with different brightness and/or color values, etc. In embodiments where all of the content of the 3D image are located in either near the accommodation zone 1010 or the far accommodation zone 1012 and the eyes of the viewer 816 verge to that depth plane, projecting all of the content of the 3-D image onto that depth plane only triggers minimal vergence-accommodation conflict.

Figure 11:
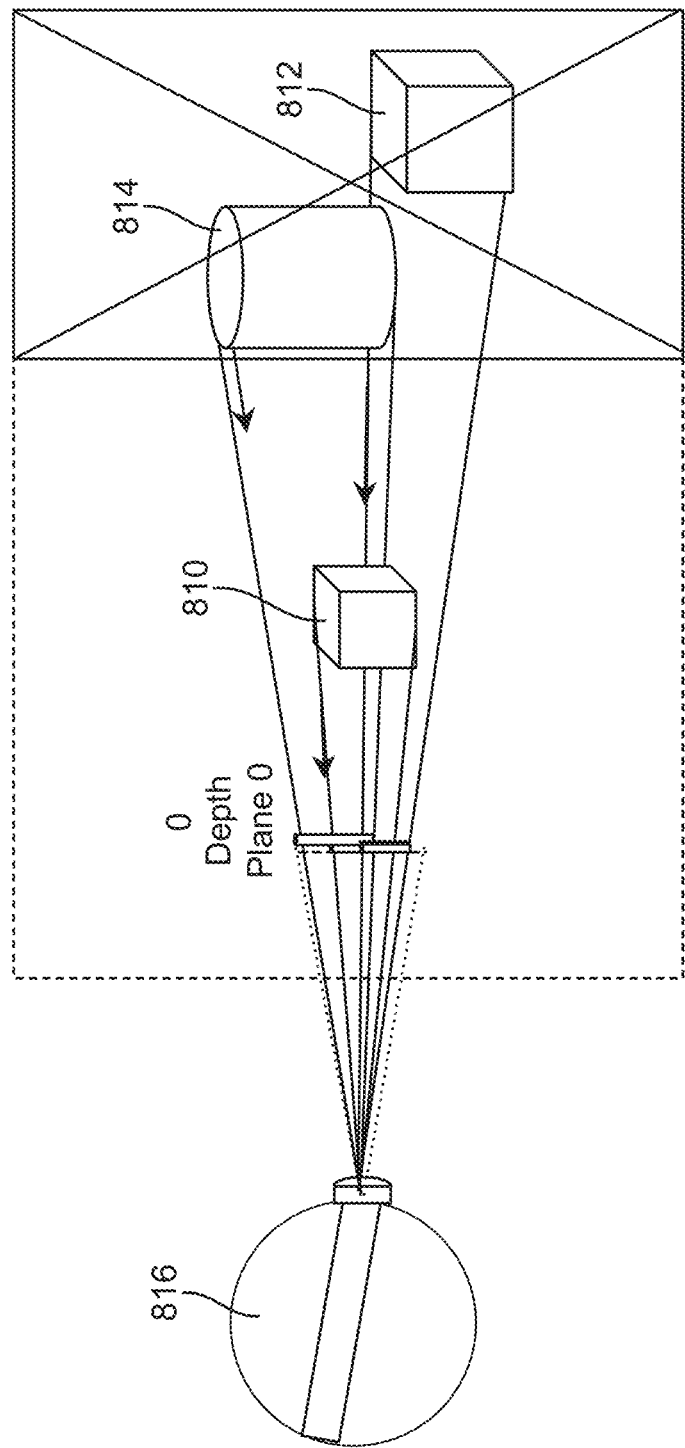
FIG. 11 schematically depicts a 3D image including a plurality of virtual objects projected onto a single depth plane for display from a side perspective view.

In some embodiments, projecting all of the content of the 3D image onto a single depth plane may trigger vergence-accommodation conflict (e.g., user discomfort, eyestrain, headaches) significant enough to affect/limit the VR/AR/MR experience. For instance, in the embodiment depicted in FIG. 10A, the far cube 812 and the cylinder 814 are located in the far accommodation zone 1012 and outside of the near accommodation zone 1010. When the attention of the viewer 816 is directed to the near cube 810, as shown in FIG. 8B, the viewer 816 can still see the far cube 812 and the cylinder 814 in the field of view of the viewer 816. The far cube 812 and the cylinder 814 do not behave optically in the same manner as real world content at their respective depths, as shown in FIG. 11. The mismatch between the accommodation estimated depth (i.e., near) and the vergence estimated depth for far cube 812 and cylinder 814 (i.e., far) can result in vergence-accommodation conflict and the associated degradation of the VR/AR/MR experience (e.g., user discomfort, eyestrain, headaches).

Further, the far cube 812 and the cylinder 814 will not have natural accommodation introduced depth blur. To simplify the 3D image rendering, the near and far cubes 810, 812 and the cylinder 814 are all rendered at full sharpness at depth plane 0. Sharpness/blurring of the 3D image content form another cue the brain uses to estimate depth. Accordingly, the mismatch between the sharpness/blurring estimated depth (i.e., near) and the vergence estimated depth for far cube 812 and cylinder 814 (i.e., far) can exacerbate vergence-accommodation conflict and the associated degradation of the VR/AR/MR experience. The possibility of selecting an incorrect depth plane due to eye tracking error and delays in switching depth planes can prolong the vergence-accommodation conflict for the viewer.

The embodiments described herein include 3D image rendering and display systems and methods for use with various VR/AR/MR systems. These 3D image rendering and display systems and methods rendering display 3-D images in a "blended mode" to minimize vergence-accommodation conflict while reducing the system resources consumed, thereby addressing many of the above described issues.

Illustrative VR, AR, and/or MR Systems

The description that follows pertains to illustrative VR, AR, and/or MR systems with which embodiments of various 3D image rendering and display systems may be practiced. However, it is to be understood that the embodiments also lends themselves to applications in other types of display systems (including other types of VR, AR, and/or MR systems), and therefore the embodiments are not to be limited to only the illustrative systems disclosed herein.

VR/AR/MR systems disclosed herein can include a display which presents computer-generated imagery (video/image data) to a user. In some embodiments, the display systems are wearable, which may advantageously provide a more immersive VR/AR/MR experience. Various components of VR, AR, and/or MR virtual image systems 100 are depicted in FIGS. 2 to 5. The virtual image generation system 100 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 includes a partially transparent display. In some embodiments, the transparent display may be electronically controlled. In some embodiments, the transparent display may include segmented dimming to control transparency of one or more portions of the transparent display. In some embodiments, the transparent display may include global dimming to control transparency of the entirety of the transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual system (i.e., one layer is within the cone of confusion of an adjacent layer). Additionally or alternatively, picture elements (i.e., sub-images) may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The virtual image generation system 100 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros). Many of these sensors operate on the assumption that the frame 102 on which they are affixed is in turn substantially fixed to the user's head, eyes, and ears.

The virtual image generation system 100 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The virtual image generation system 100 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), display bridge chips, display controllers, programmable gate arrays (PGAs), for instance field PGAs (FPGAs), and/or programmable logic controllers (PLUs).

The control subsystem of virtual image generation system 100 may include a central processing unit (CPU), a graphics processing unit (GPU), one or more frame buffers, and a three-dimensional database for storing three-dimensional scene data. The CPU may control overall operation, while the GPU may render frames (i.e., translating a three-dimensional scene into a two-dimensional image) from the three-dimensional data stored in the three-dimensional database and store these frames in the frame buffers. One or more additional integrated circuits may control the reading into and/or reading out of frames from the frame buffers and operation of the image projection assembly of the display subsystem 110.

Figure 1:
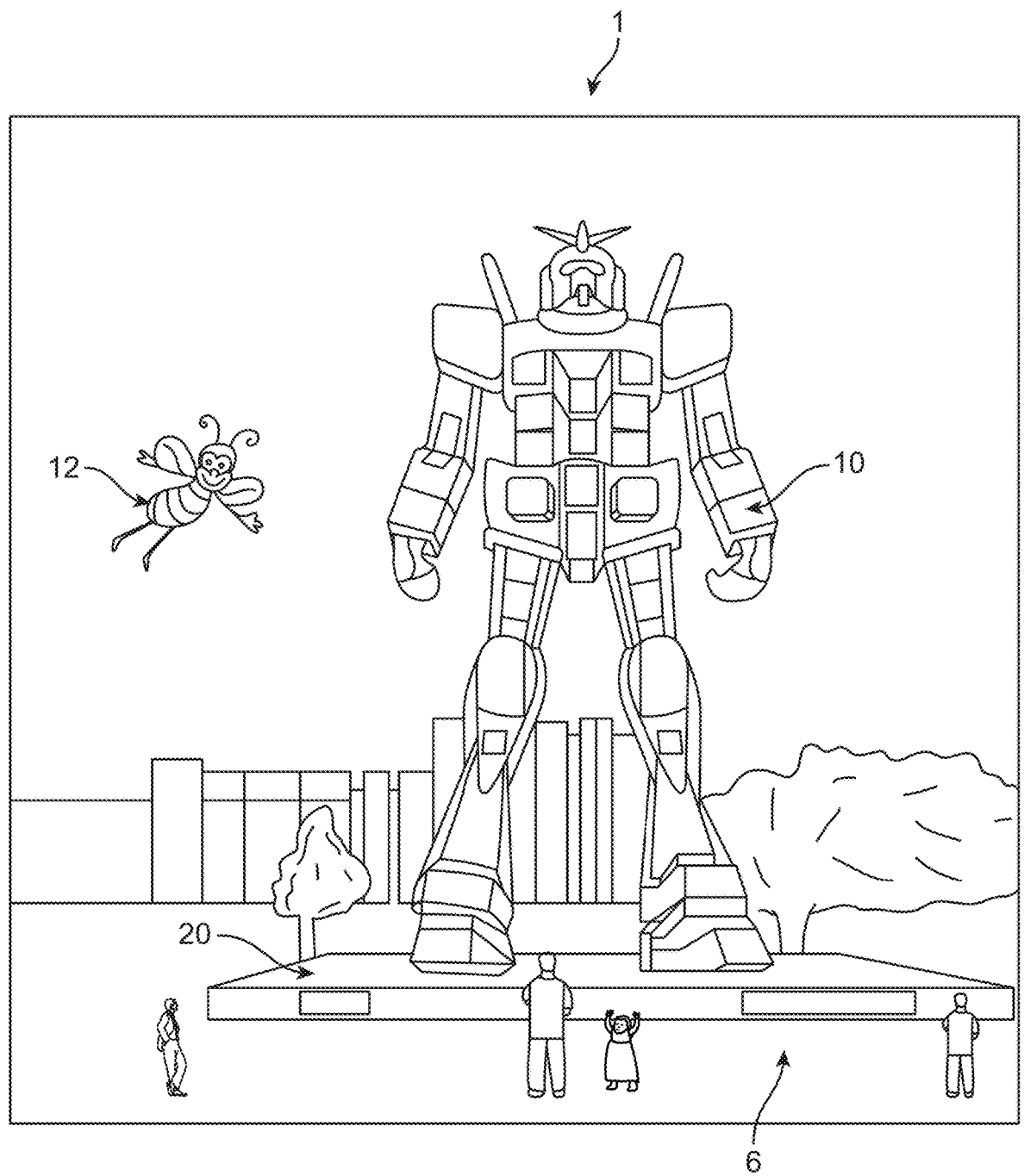
FIG. 1 illustrates a user's view of an AR/MR scene using an example AR system.
Figure 2:
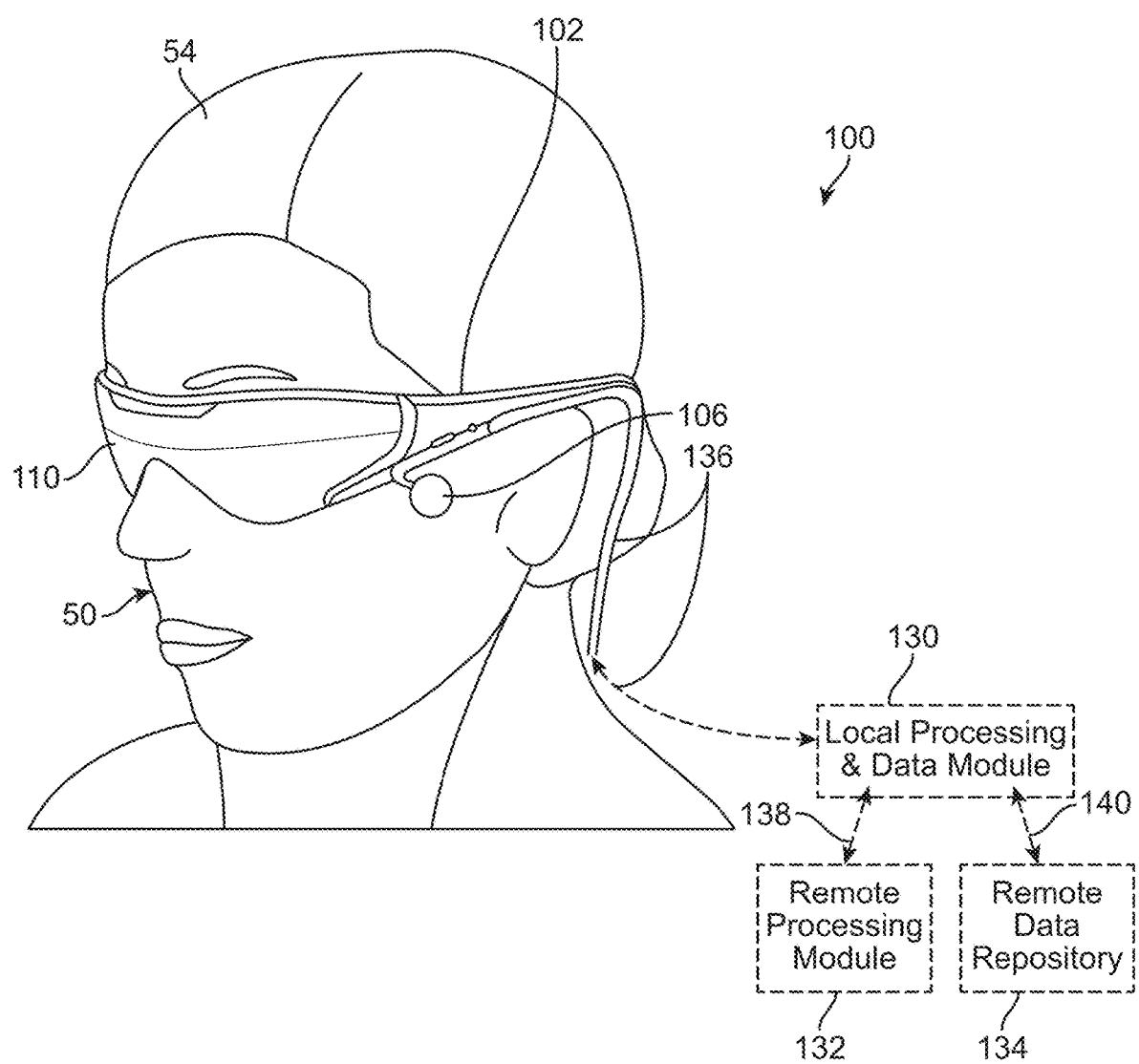
FIGS. 2-5 schematically depict users using VR/AR/MR systems according to some embodiments.
Figure 3:
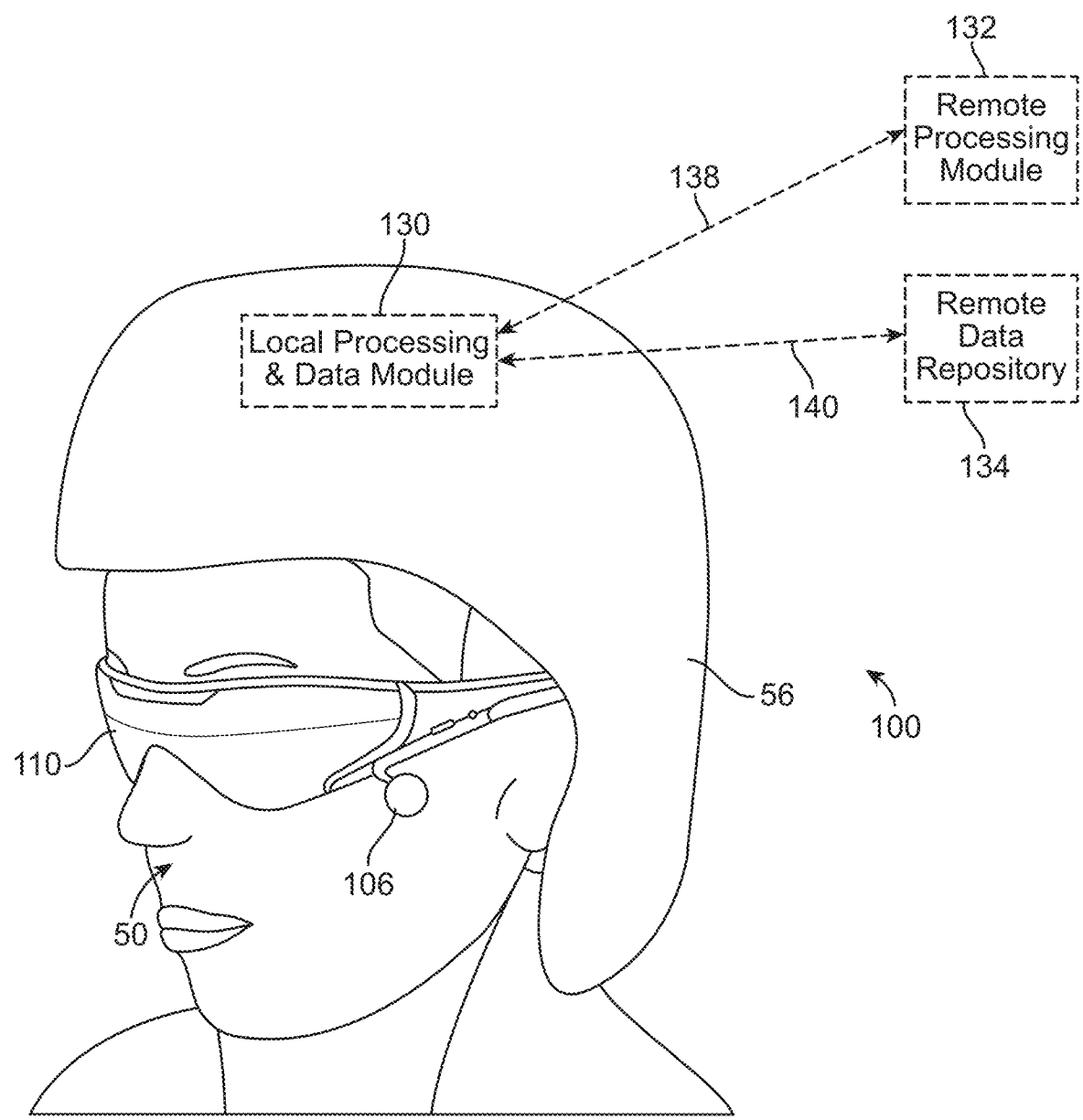
Figure 4:
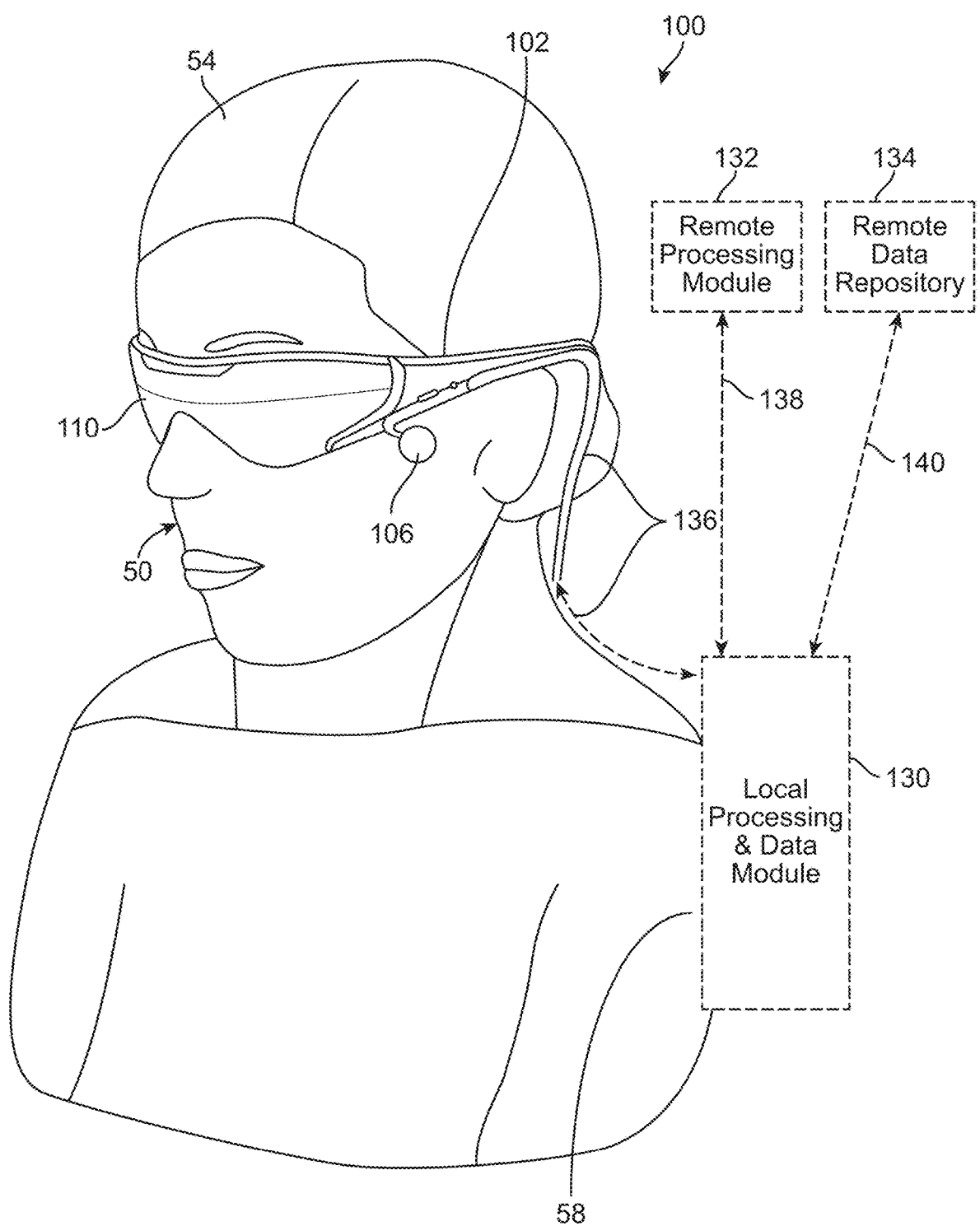
Figure 5:
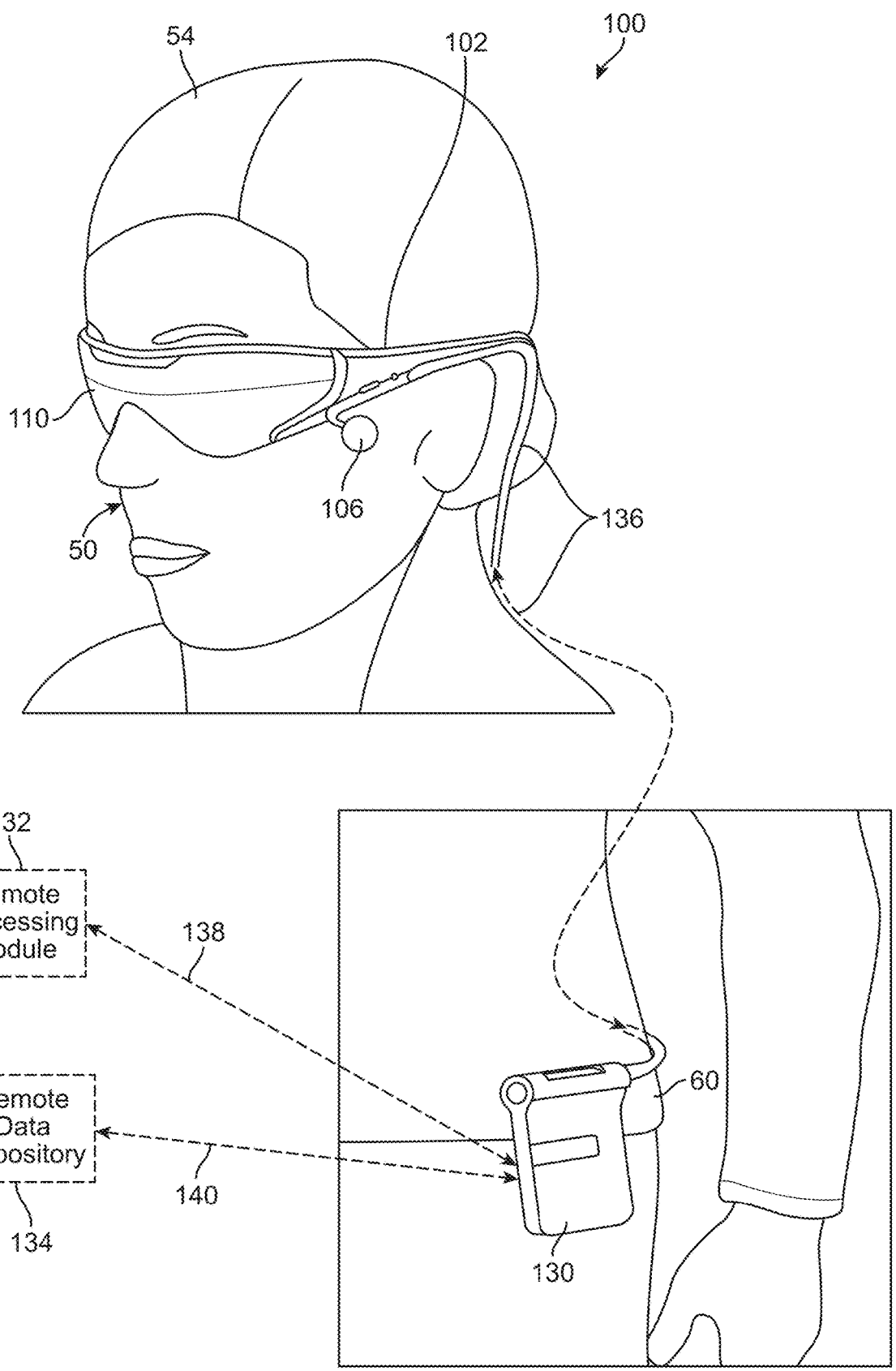

The various processing components of the virtual image generation system 100 may be physically contained in a distributed subsystem. For example, as illustrated in FIGS. 2 to 5, the virtual image generation system 100 may include a local processing and data module 130 operatively coupled, such as by a wired lead or wireless connectivity 136, to a local display bridge 142, the display subsystem 110, and sensors. The local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5). The virtual image generation system 100 may also include a remote processing module 132 and remote data repository 134 operatively coupled, such as by a wired lead or wireless connectivity 138, 140, to the local processing and data module 130 and the local display bridge 142, such that these remote modules 132, 134 are operatively coupled to each other and available as resources to the local processing and data module 130 and the local display bridge 142.

The local processing and data module 130 and the local display bridge 142 may each include a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may include one or more relatively powerful processors or controllers configured to analyze and process data and/or image information. The remote data repository 134 may include a relatively large-scale digital data storage facility, which may be available through the internet or other networking configuration in a "cloud" resource configuration. In some embodiments, all data is stored and all computation is performed in the local processing and data module 130 and the local display bridge 142, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 2 to 5. Thus, the particular choice of wired or wireless communications should not be considered limiting.

In some embodiments, the user orientation module is contained in the local processing and data module 130 and/or the local display bridge 142, while CPU and GPU are contained in the remote processing module. In alternative embodiments, the CPU, GPU, or portions thereof may be contained in the local processing and data module 130 and/or the local display bridge 142. The 3D database can be associated with the remote data repository 134 or disposed locally.

Some VR, AR, and/or MR systems use a plurality of volume phase holograms, surface-relief holograms, or light guiding optical elements that are embedded with depth plane information to generate images that appear to originate from respective depth planes. In other words, a diffraction pattern, or diffractive optical element (DOE) may be embedded within or imprinted/embossed upon a light guiding optical element (LOE; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (1/2 diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2 N or 3 N stacked LOEs may be used to generate RGB colored images at N depth planes.

In order to present 3D virtual content to the user, the VR, AR, and/or MR system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may simultaneously see a virtual bird at a distance of 3 meters away from the user and a virtual coffee cup at arm's length (about 1 meter) from the user. Alternatively, the user may see a virtual dragon appear from infinity and run towards the user.

Figure 6:
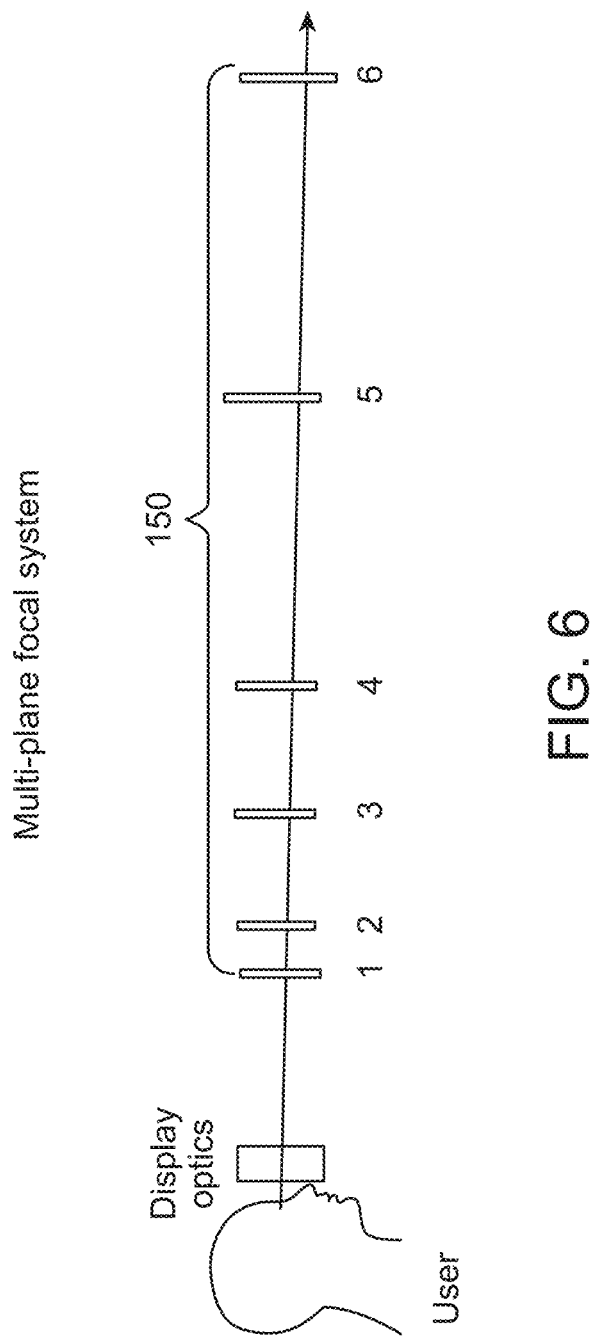
FIG. 6 schematically depicts various planes of a multi-plane focal system according to some embodiments.

Multiple-plane focus systems create a perception of variable depth by projecting images on some or all of a plurality of depth planes located at respective fixed distances in the Z direction from the user's eye. Referring now to FIG. 6, it should be appreciated that multiple-plane focus systems may display frames at fixed depth planes 150 (e.g., the six depth planes 150 shown in FIG. 6). Although MR systems can include any number of depth planes 150, one exemplary multiple-plane focus system has six fixed depth planes 150 in the Z direction. In generating virtual content one or more of the six depth planes 150, 3D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 6. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane DP1 may be ⅓ diopters away, depth plane DP2 may be 0.3 diopters away, depth plane DP3 may be 0.2 diopters away, depth plane DP4 may be 0.15 diopters away, depth plane DP5 may be 0.1 diopters away, and depth plane DP6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane DP1, while another virtual object appears at infinity at depth plane DP6. Alternatively, the virtual object may first be displayed at depth plane DP6, then depth plane DP5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In some embodiments, the VR, AR, and/or MR system may work as a multiple-plane focus system. In other words, all six LOEs may be illuminated almost simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane DP6 from FIG. 6) may be utilized. Then an image of a closer tree branch may be injected at time 2 and an LOE configured to create an image appearing to originate from a depth plane 10 meters away (e.g., depth plane DP5 from FIG. 6) may be utilized; then an image of a pen may be injected at time 3 and an LOE configured to create an image appearing to originate from a depth plane 1 meter away may be utilized. This type of paradigm can be repeated in rapid time sequential fashion such that the user's eye and brain (e.g., visual cortex) perceives the input to be all part of the same image.

VR, AR, and/or MR systems may project images (i.e., by diverging or converging light beams) that appear to originate from various locations along the Z axis (i.e., depth planes) to generate images for a 3D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Figure 7:
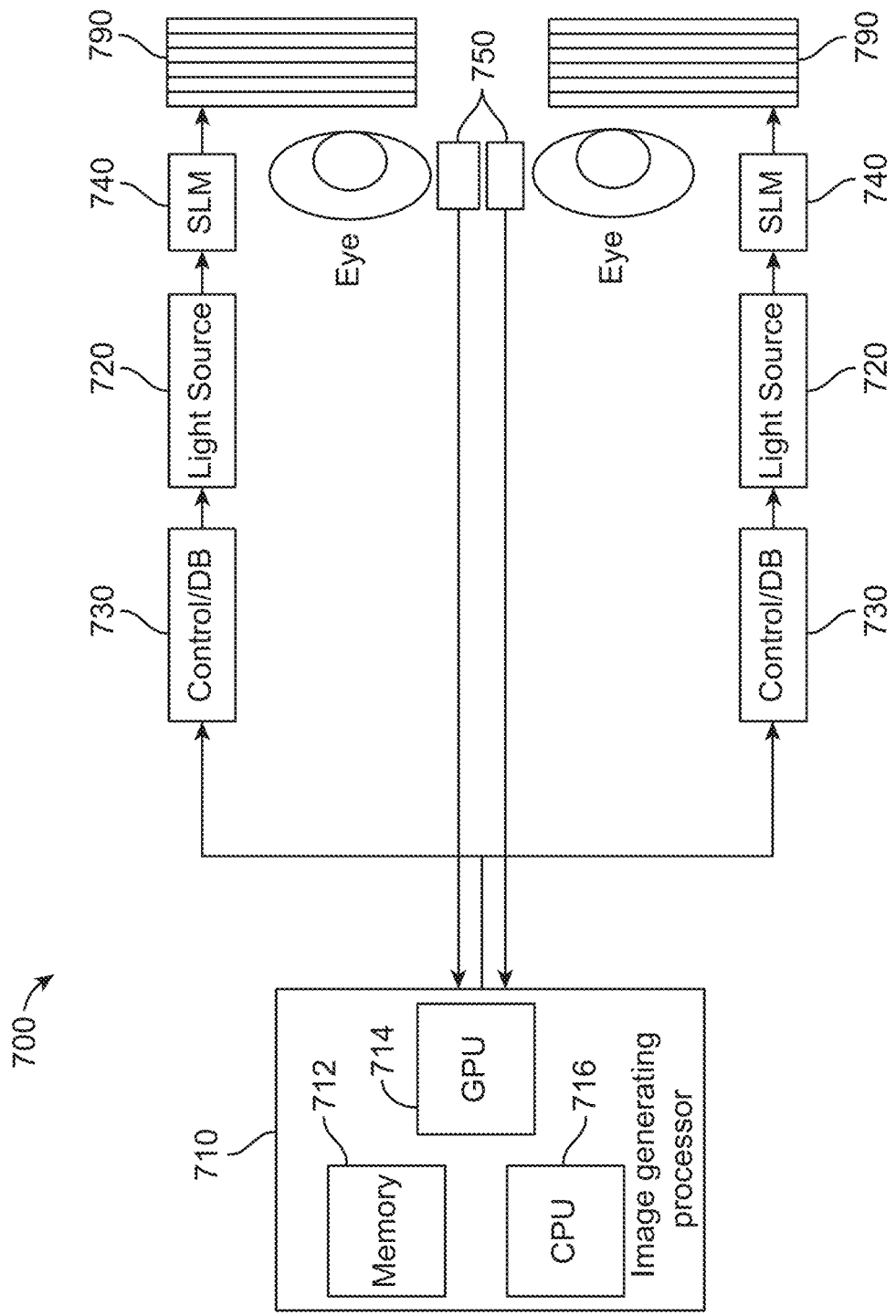
FIG. 7 schematically depicts a VR/AR/MR system according to some embodiments.

Referring now to FIG. 7, an exemplary embodiment of an AR or MR system 700 (hereinafter referred to as "system 700") is illustrated. The system 700 uses stacked light guiding optical element (hereinafter referred to as "LOEs 790"). The system 700 generally includes one or more image generating processors 710, one or more light sources 720, one or more controller/display bridges (DB) 730, one or more spatial light modulators (SLM) 740, and one or more sets of stacked LOEs 790 that function as a multiple plane focus system. The system 700 may also include an eye-tracking subsystem 750.

The image generating processor 710 is configured to generate virtual content to be displayed to the user. The image generating processor 710 may convert an image or video associated with the virtual content to a format that can be projected to the user in 3D. For example, in generating 3D content, the virtual content may need to be formatted such that portions of a particular image are displayed at a particular depth plane while others are displayed at other depth planes. In one embodiment, all of the image may be generated at a particular depth plane. In another embodiment, the image generating processor 710 may be programmed to provide slightly different images to the right and left eyes such that when viewed together, the virtual content appears coherent and comfortable to the user's eyes.

The image generating processor 710 may further include a memory 712, a GPU 714, a CPU 716, and other circuitry for image generation and processing. The image generating processor 710 may be programmed with the desired virtual content to be presented to the user of the system 700. It should be appreciated that in some embodiments, the image generating processor 710 may be housed in the system 700. In other embodiments, the image generating processor 710 and other circuitry may be housed in a belt pack that is coupled to the system 700. In some embodiments, the image generating processor 710, or one or more components thereof, may be a part of a local processing and data module (e.g., local processing and data module 130). As mentioned above, the local processing and data module 130 may be mounted in a variety of configurations, such as fixedly attached to the frame structure 102 (FIG. 2), fixedly attached to a helmet or hat 56 (FIG. 3), removably attached to the torso 58 of the end user 50 (FIG. 4), or removably attached to the hip 60 of the end user 50 in a belt-coupling style configuration (FIG. 5).

The image generating processor 710 is operatively coupled to the light source 720 which projects light associated with the desired virtual content and one or more spatial light modulators 740. The light source 720 is compact and has high resolution. The light source 720 is operatively coupled to a controller/DB 730. The light source 720 may be include color specific LEDs and lasers disposed in various geometric configurations. Alternatively, the light source 720 may include LEDs or lasers of like color, each one linked to a specific region of the field of view of the display. In another embodiment, the light source 720 may include a broad-area emitter such as an incandescent or fluorescent lamp with a mask overlay for segmentation of emission areas and positions. Although the light source 720 is directly connected to the system 700 in FIG. 2B, the light source 720 may be connected to the system 700 via optical fibers (not shown). The system 700 may also include condenser (not shown) configured to collimate the light from the light source 720.

The SLM 740 may be reflective (e.g., an LCOS, an FLCOS, a DLP DMD, or a MEMS mirror system), transmissive (e.g., an LCD) or emissive (e.g. an FSD or an OLED) in various exemplary embodiments. The type of SLM 740 (e.g., speed, size, etc.) can be selected to improve the creation of the 3D perception. While DLP DMDs operating at higher refresh rates may be easily incorporated into stationary systems 700, wearable systems 700 may use DLPs of smaller size and power. The power of the DLP changes how 3D depth planes/focal planes are created. The image generating processor 710 is operatively coupled to the SLM 740, which encodes the light from the light source 720 with the desired virtual content. Light from the light source 720 may be encoded with the image information when it reflects off of, emits from, or passes through the SLM 740.

Light from the SLM 740 is directed to the LOEs 790 such that light beams encoded with image data for one depth plane and/or color by the SLM 740 are effectively propagated along a single LOE 790 for delivery to an eye of a user. Each LOE 790 is configured to project an image or sub-image that appears to originate from a desired depth plane or FOV angular position onto a user's retina. The light source 720 and LOEs 790 can therefore selectively project images (synchronously encoded by the SLM 740 under the control of controller/DB 730) that appear to originate from various depth planes or positions in space. By sequentially projecting images using each of the light source 720 and LOEs 790 at a sufficiently high frame rate (e.g., 360 Hz for six depth planes at an effective full-volume frame rate of 60 Hz), the system 700 can generate a 3D image of virtual objects at various depth planes that appear to exist simultaneously in the 3D image.

The controller/DB 730 is in communication with and operatively coupled to the image generating processor 710, the light source 720 and the SLM 740 to coordinate the synchronous display of images by instructing the SLM 740 to encode the light beams from the light source 720 with appropriate image information from the image generating processor 710. While the system includes an image generating processor 710, the controller/DB 730, in some embodiments, may also perform at least some image generating processes including, for example, the processes of the memory 712, the GPU 714, and/or the CPU 716. In some embodiments, the controller/DB 730 may include one or more components shown in the image generating processor 710, such as, for example, the memory 712, the GPU 714, and/or the CPU 716.

The system 700 may also include an optional eye-tracking subsystem 750 that is configured to track the user's eyes to determine the user's point of vergence. In one embodiment, the system 700 is configured to illuminate a subset of LOEs 790, based on input from the eye-tracking subsystem 750 such that the image is generated at a desired depth plane that coincides with the user's point of vergence as shown in FIGS. 9A and 9B. For example, if the user's eyes are parallel to each other, the system 700 may illuminate the LOE 790 that is configured to deliver collimated light to the user's eyes, such that the image appears to originate from optical infinity. In another example, if the eye-tracking subsystem 750 determines that the user's point of vergence is at 1 meter away, the LOE 790 that is configured to focus approximately within that range may be illuminated instead. In embodiments where depth planes approximating the entire depth range are simultaneously (or almost simultaneously) illuminated, the optional eye-tracking subsystem 750 is not required to determine the user's point of vergence in order to choose one or more depth planes to illuminate. Eliminating the need for the optional eye-tracking subsystem 750 reduces the size of the VR/AR/MR system 700, its processing requirements, and its power and memory requirements.

Illustrative Blended Mode Rendering And Display Systems

FIG. 12 depicts a "blended mode" of rendering and displaying 3D images, according to some embodiments. A blended mode display presents a synthetic light field generated from a combination of at least two discrete depth planes 0, 1. Due to a tolerance between accommodation and vergence (e.g., ±0.75 diopter), by configuring the rendering and display system to position a near depth plane 0 and a far depth plane 1 within a predetermined number of diopters of each other (e.g., 1.5 diopters), these two depth planes 0, 1 can cover an entire 3D field of view from approximately a cut-off minimum distance of a viewer's vision to approximately infinity, as shown in FIG. 10A. The blended mode synthetic light field simulates a viewer's accommodation to any position between the two depth planes 0, 1 as a scaler blend of sub-images as projected onto the two depth planes 0, 1. Through scaler blending of sub-images at the two depth planes 0, 1, the blended mode synthetic light field can simulate accommodation to one or more virtual depth planes 1210.

Figure 13A:
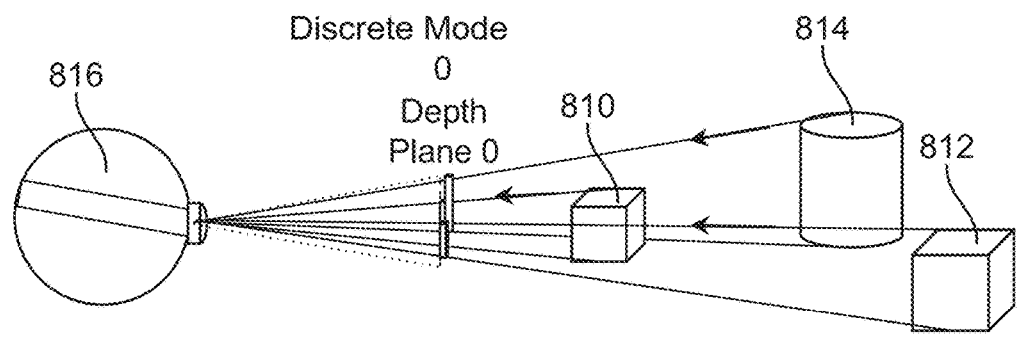
FIG. 13A schematically depicts a 3D image including a plurality of virtual objects projected onto a single depth plane for display from a side perspective view.

Blended mode increases the fidelity of viewer accommodation resulting in a more natural depth perception. For instance, FIG. 13A depicts a discrete mode display system where the near and far cubes 810, 812 and the cylinder 814 are projected onto the near depth plane 0 in response to tracking the point of vergence of the viewer 816 to the near cube 810, which is adjacent the near depth plane 0. Projection to the near depth plane 0 results in viewer accommodation to the near depth plane 0 even for the far cubes 812 and the cylinder 814, which are closer to the far depth plane 1 than the near depth plane 0.

Figure 13B:
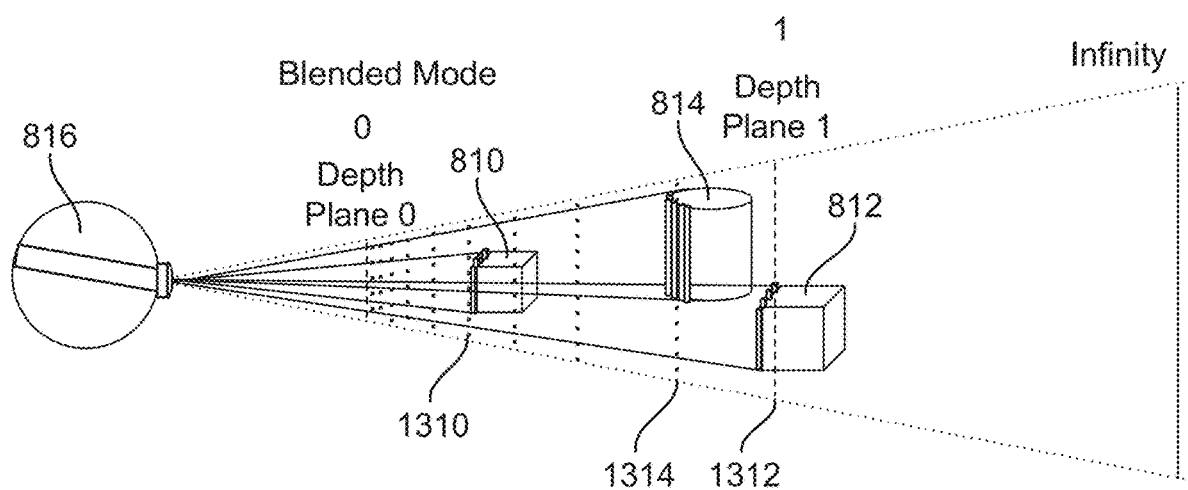
FIG. 13B schematically depicts a 3D image including a plurality of virtual objects in a blended mode display with a plurality of virtual depth planes from a side perspective view.

On the other hand, FIG. 13B depicts a blended mode synthetic light field, according to some embodiments. In the blended display mode, the near and far cubes 810, 812 and the cylinder 814 are "virtually projected" onto respective virtual depth planes 1310, 1312, 1314 adjacent the respective location of the. near and far cubes 810, 812 and the cylinder 814 along an optical axis ("Z axis") of the system. The near and far cubes 810, 812 and the cylinder 814 are only virtually projected because only the near and far depth planes 0, 1 are actually illuminated. As described above, virtual projection onto virtual depth planes 1310, 1312, 1314 are simulated through scaler blending of the sub-images projected onto the near and far depth planes 0, 1.

FIGS. 14A to 15B depict rendering and displaying of a blended light field through scaler blending of sub-images projected onto near and far depth planes 0, 1, according to some embodiments. A hardware refresh rate of the embodiment depicted in FIGS. 14A to 15B is approximately 360 Hz, which is equivalent to 120 Hz in RGB color. The rendering and displaying system simulates a 60 Hz synthetic 3D light field by taking advantage of the human visual system's tendency to blend two sequential flashes that are close in time to each other (i.e., near depth plane 0 followed by far depth plane 1). This creates an effective 60 Hz display with 6 flashes (e.g., R0G0B0B1G1R1). In order to render the sub-images, each pixel in the frame is depth tagged with best known depth data (e.g., from the 3D image data). Then the system uses the best known depth data to calculate two scalar values for each pixel, one for projection to near depth plane 0, the other for projection to far depth plane 1. Any object nearer than near depth plane 0 or farther than far depth plane 1 is only projected when the respective depth planes 0, 1 are illuminated. The blending analysis used to calculate the scalar values may include linear interpolation, a non-linear interpolation, and/or one or more linear interpolations. One of ordinary skill in the art will appreciate the blending analysis may include other interpolation techniques.

Display systems such as a projector with a liquid crystal on silicon (LCOS) light source sequentially flash each color at each depth plane (e.g., R0G0B0B1G1R1, R0R1G0G1B0B1, or in some other fashion). Display systems such as scanning fiber displays can "simultaneously" flash images at each depth plane by rastering color images at both depth planes.

Figure 14A:
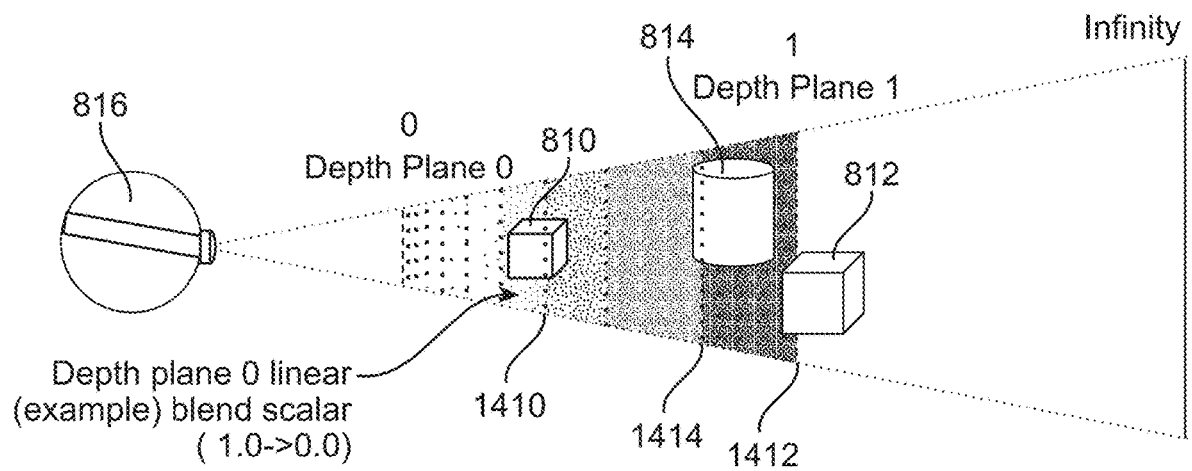
FIGS. 14A and 14B schematically depict a 3D image including a plurality of virtual objects projected onto a near depth plane as part of a blended mode display from a side perspective view (FIG. 14A) and a rear perspective view (FIG. 14B).
Figure 14B:
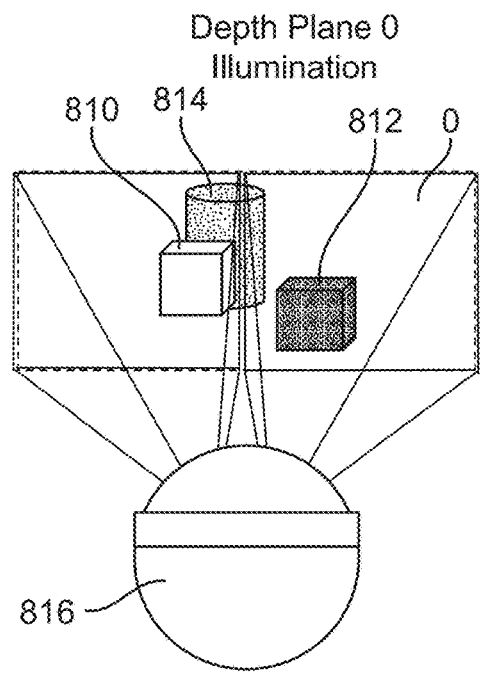

FIG. 14A depicts the scalar values for near depth plane 0 when sub-images of a 3D image are displayed thereon. The lighter the sub-image, the more it is illuminated at near depth plane 0. Conversely, the darker the sub-image, the less it is illuminated at near depth plane 0. In this embodiment, the scalar values are determined using linear blending. FIG. 14B depicts a viewer's perspective view of the near depth plane 0 as illuminated in FIG. 14A. The near cube 810, which is closer to the near depth plane 0, is lighter (i.e., more illuminated) at the near depth plane 0 compared to the cylinder 814. Conversely, the cylinder 814, which is farther from the near depth plane 0, is darker (i.e., less illuminated) at the near depth plane 0 compared to the near cube 810. The far cube 812, which is much farther from the near depth plane 0 compared to either the near cube 810 or the cylinder 814, is almost black (i.e., not illuminated) at the near depth plane 0.

Figure 15A:
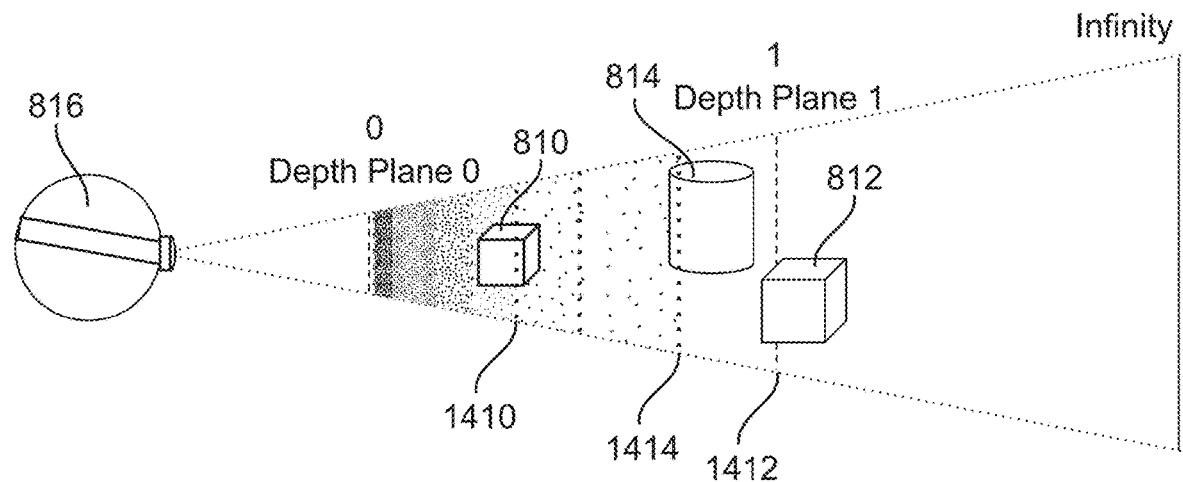
FIGS. 15A and 15B schematically depict a 3D image including a plurality of virtual objects projected onto a far depth plane as part of a blended mode display from a side perspective view (FIG. 15A) and a rear perspective view (FIG. 15B).
Figure 15B:
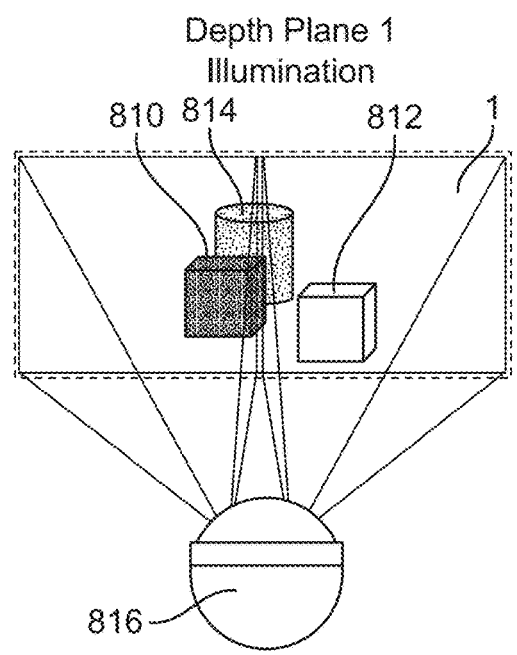

FIG. 15A depicts the scalar values for far depth plane 1 when sub-images of the 3D image are displayed thereon. The lighter the sub-image, the more it is illuminated at far depth plane 1. Conversely, the darker the sub-image, the less it is illuminated at far depth plane 1. FIG. 15B depicts a viewer's perspective view of the far depth plane 1 as illuminated in FIG. 15A. The far cube 812, which is closer to the far depth plane 1, is lighter (i.e., more illuminated) at the far depth plane 1 compared to the cylinder 814. Conversely, the cylinder 814, which is farther from the far depth plane 1, is darker (i.e., less illuminated) at the far depth plane 1 compared to the far cube 812. The near cube 810, which is much farther from the far depth plane 1 compared to either the far cube 812 or the cylinder 814, is almost black (i.e., minimally illuminated) at the far depth plane 1.

The linear blending results in scalar values at the near and far depth planes 0, 1 such that simultaneous (e.g., fiber scanning display) or near-simultaneous, sequential (e.g., projector with an LCOS light source) illumination of the near and far depth planes 0, 1 is interpreted by the human visual system as one or more sub-images at a corresponding plurality of virtual depth planes 1410, 1412, 1414.

Figure 16A:
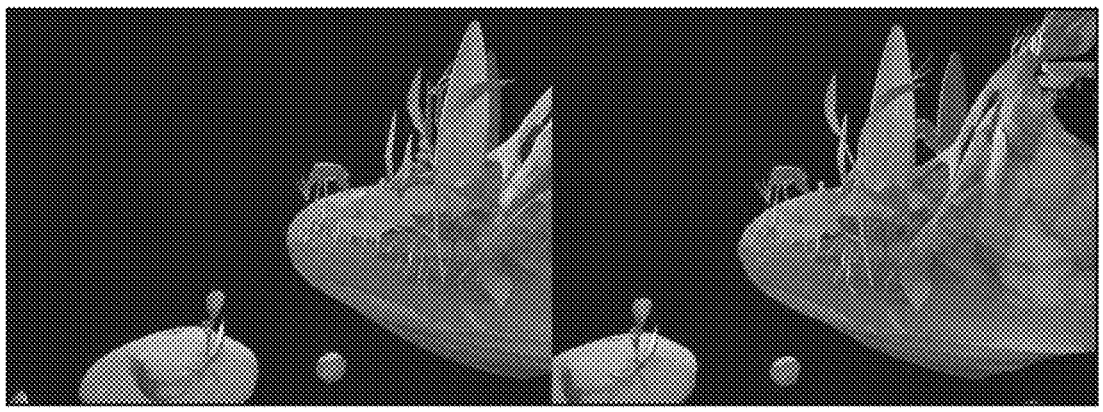
FIGS. 16A and 16B depict left and right near (FIG. 16A) and far (FIG. 16B) depth planes that form a blended mode display of a 3D image including a plurality of virtual objects from a rear perspective view.
Figure 16B:
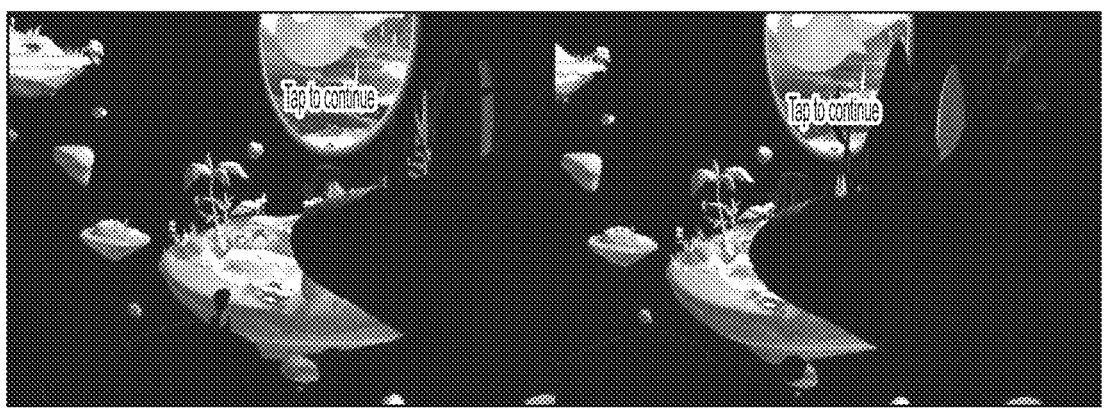

FIGS. 16A and 16B depict left and right depth planes of a blended mode synthetic light field, according to some embodiments. Specifically, FIG. 16A depicts left and right near depth planes of a blended mode synthetic light field, and FIG. 16B depicts the left and right far depth planes of a blended mode synthetic light field. The left and right sub-images are rendered to simulate stereoscopic vision. The sub-images at the respective near and far depth planes are interpreted by the human visual system as one or more sub-images at one or more virtual depth planes, thereby forming a synthetic 3D light field for the 3D image.

The sub-images for display at the near and far depth planes may be rendered/generated by applying a blending analysis. The blending analysis may involve a linear interpolation, a non-linear interpolation (e.g., complementary sigmoid falloffs), and/or one or more linear interpolations (e.g., using look up tables of linear interpolations to approximate a curve). One of ordinary skill in the art will appreciate the blending analysis may include other interpolation techniques. The content of the 3D image may be tagged as "near only" (i.e., closer than the near depth plane), "far only" (i.e., farther than the far depth plane), or "overlap region" (i.e., in a specific region between the near and far depth planes). The near only content may be displayed only at the near depth plane. The far only content may be displayed only at the far depth plane. The overlap region content may be blended using various techniques for display at both the near and far depth planes as shown in FIGS. 14B and 15B.

Each piece of 3D image content has a best known depth that is used to place the content in the "near only," "far only," and "overlap region" groups. The best known depth may be generated using one or more of disparity maps and tile based re-projection involving depth segmentation information (stored in a depth buffer), stereo color pair information, and real world mesh information. The best known depth information may also be used to blend the content in the "overlap region" group. Stereo color pair information relates to a pair of 2D images formed by projecting the 3D image content using two different points of view. Disparity maps depict the differences between 2D images formed by projecting the 3D image content using two different points of view. In one embodiment, a disparity map includes, for each pixel in the 3D image content, the distance between the projected pixels in each of the two projected 2D images from the different points of view. Real world mesh information relates to graphical representation of image data (e.g., projected onto or captured from the environment) using polygons.

After the sub-images for display at the near and far depth plan are rendered, their display may be controlled by a display controller operatively coupled to a graphical processing unit and a display device.

Illuminating near and far depth planes, using a blended display mode to simulate one or more virtual depth planes, provides a synthetic 3D light field with minimal display and graphical processing requirements. Further, the synthetic 3D light field more accurately reproduces a 3D image, thereby reducing vergence-accomodation conflict, such as that encountered with discrete mode display systems. Moreover, blended mode display systems such as those described herein can operate without eye-tracking subsystems (e.g., cameras, IR lights, processing units, memory, etc.), thereby reducing the hardware and processing demands on portable 3D display systems with limited system resources.

System Architecture Overview

Figure 17:
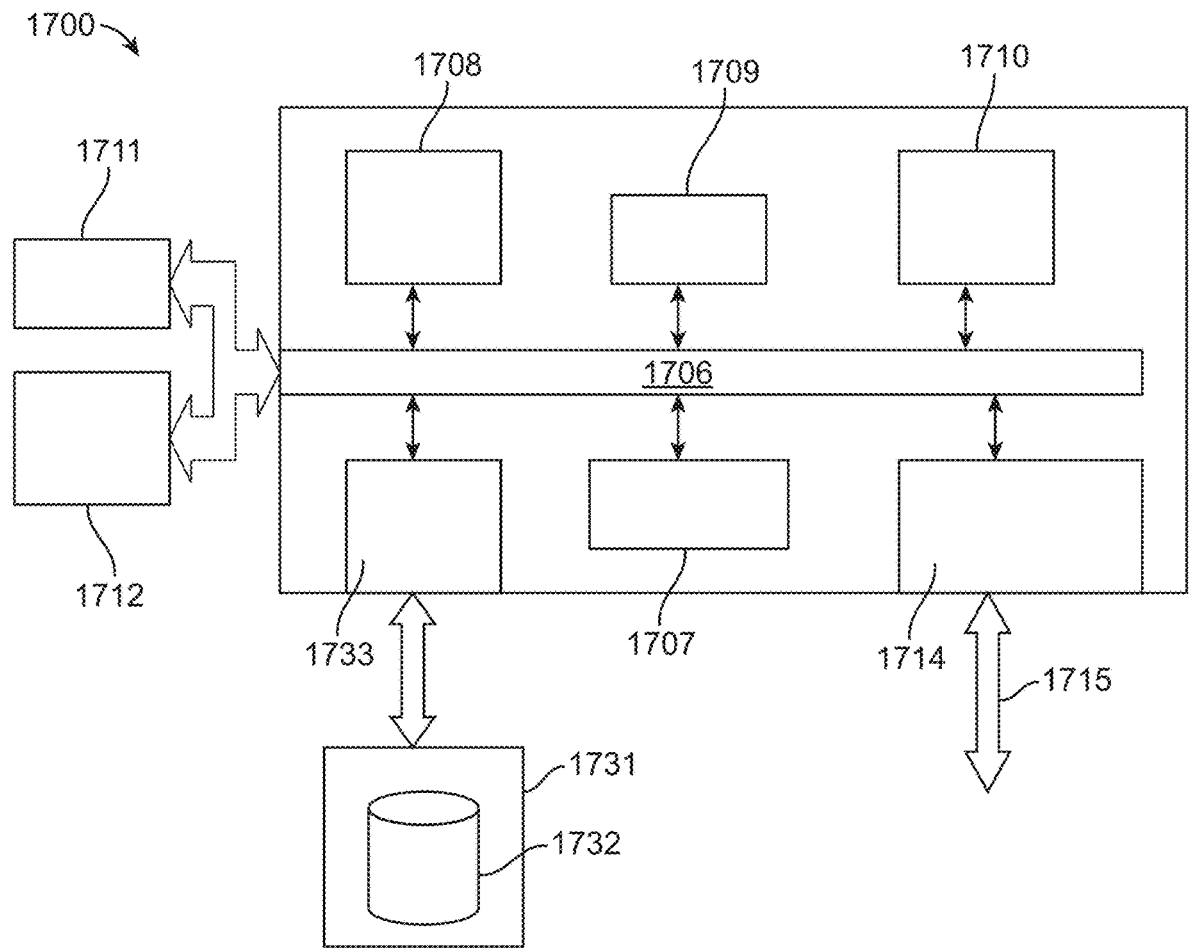
FIG. 17 is a block diagram schematically depicting an illustrative computing system, according to some embodiments.

FIG. 17 is a block diagram of an illustrative computing system 1700 suitable for implementing an embodiment of the present disclosure. Computer system 1700 includes a bus 1706 or other communication mechanism for communicating information, which interconnects subsystems and devices, such as processor 1707, system memory 1708 (e.g., RAM), static storage device 1709 (e.g., ROM), disk drive 1710 (e.g., magnetic or optical), communication interface 1714 (e.g., modem or Ethernet card), display 1711 (e.g., CRT or LCD), input device 1712 (e.g., keyboard), and cursor control.

According to one embodiment of the disclosure, computer system 1700 performs specific operations by processor 1707 executing one or more sequences of one or more instructions contained in system memory 1708. Such instructions may be read into system memory 1708 from another computer readable/usable medium, such as static storage device 1709 or disk drive 1710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1707 for execution. Such a medium may take many forms, including but not limited to, non-volatile media and volatile media. Non-volatile media includes, for example, optical or magnetic disks, such as disk drive 1710. Volatile media includes dynamic memory, such as system memory 1708.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 1700. According to other embodiments of the disclosure, two or more computer systems 1700 coupled by communication link 1715 (e.g., LAN, PTSN, or wireless network) may perform the sequence of instructions required to practice the disclosure in coordination with one another.

Computer system 1700 may transmit and receive messages, data, and instructions, including program, i.e., application code, through communication link 1715 and communication interface 1714. Received program code may be executed by processor 1707 as it is received, and/or stored in disk drive 1710, or other non-volatile storage for later execution. Database 1732 in storage medium 1731 may be used to store data accessible by system 1700 via data interface 1733.

While the blended mode embodiments described above include two depth planes (e.g., near and far depth planes), other embodiments may include more than two depth planes. Increasing the number of depth planes increases the fidelity with which virtual depth planes are simulated. However, this increase in fidelity is offset by an increase in hardware and processing demands, which can exceed the resources available in current portable 3D rendering and display systems.

Certain aspects, advantages and features of the disclosure have been described herein. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, and the like described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can include computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media that, when read by a computer or other processing device, cause it to carry out the method.

While certain embodiments have been explicitly described, other embodiments will become apparent to those of ordinary skill in the art based on this disclosure.

The various processors and other electronic components described herein are suitable for use with any optical system for projecting light. The various processors and other electronic components described herein are also suitable for use with any audio system for receiving voice commands.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art, each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A method for displaying a three dimensional ("3D") image in a blended mode, comprising:
   rendering a frame of 3D image data;
   analyzing the frame of 3D image data to generate depth data;
   using the depth data to segment the 3D image data into: i) at least one near frame of two dimensional ("2D") image data corresponding to a near depth, and ii) at least one far frame of 2D image data corresponding to a far depth that is farther than the near depth from a point of view;
   using the depth data to determine scalar values for pixels of a sub-image in the frame of 3D image data; and
   displaying the near and far frames at the near and far depths respectively, wherein the sub-image is displayed in at least one of the near frame and far frame at a level of illumination based at least in part on the scalar values of the pixels of the sub-image, and wherein the near and far frames are displayed simultaneously.

2. The method of claim 1, wherein the frame of 3D image data comprises:
   depth segmentation data;
   stereo color pair data; and
   real world mesh data.

3. The method of claim 1, wherein analyzing the frame of 3D image data to generate the depth data comprises:
   generating a disparity map from the frame of 3D image data; and
   re-projecting the frame of 3D image data.

4. The method of claim 1, wherein using the depth data to segment the 3D image data into the near and far of frames of 2D image data comprises:
   identifying a near only set of virtual objects/pixels having respective depths in a near depth range;
   identifying a far only set of virtual objects/pixels having respective depths in a far depth range; and
   identifying a near and far overlap set of virtual objects/pixels having respective depths in a middle depth range.

5. The method of claim 4, wherein using the depth data to segment the 3D image data into the near and far of frames of 2D image data further comprises:
   adding the near only set of virtual objects/pixels to the near frame of 2D image data;
   adding the far only set of virtual objects/pixels to the far frame of 2D image data;
   performing a blending analysis on the near and far overlap set of virtual objects/pixels to identify a near overlap set of virtual objects/pixels and a far overlap set of virtual objects/pixels;
   adding the near overlap set of virtual objects/pixels to the near frame of 2D image data; and
   adding the far overlap set of virtual objects/pixels to the far frame of 2D image data.

6. The method of claim 5, wherein the blending analysis involves a linear interpolation, a non-linear interpolation, and/or a plurality of linear interpolations.

7. A method for displaying a three dimensional ("3D") image in a blended mode, comprising:
rendering a frame of 3D image data;
analyzing the frame of 3D image data to generate depth data;
using the depth data to segment the 3D image data into a plurality of frames of two dimensional ("2D") image data;
using the depth data to determine scalar values for pixels of a sub-image in the frame of 3D image data;
displaying the plurality of frames, wherein the plurality of frames comprises:
a left near frame of 2D image data corresponding to a near depth;
a left far frame of 2D image data corresponding to a far depth that is farther than the near depth from a point of view;
a right near frame of 2D image data corresponding to the near depth; and
a right far frame of 2D image data corresponding to the far depth,
wherein the left near frame and the left far frame are displayed simultaneously, and
wherein the right near frame and the right far frame are displayed simultaneously; and
wherein the sub-image is displayed in at least one of the frames at a level of illumination based at least in part on the scalar values of the pixels of the sub-image.

8. The method of claim 7, wherein the left near frame and the left far frame are displayed to a left eye of a user.

9. The method of claim 7, wherein the right near frame and the right far frame are displayed to a right eye of a user.

10. The method of claim 7, wherein the left near frame and the right near frame are displayed to a user at a first depth from the user.

11. The method of claim 10, wherein the left far frame and the right far frame are displayed to the user at a second depth from the user, the second depth being greater than the first depth.

12. The method of claim 11, wherein the first and second depths correspond to about 1.96 and about 0.67 respectively.

13. The method of claim 7, wherein when the left near frame, the left far frame, the right near frame, and the right far frame are displayed to a user, the user perceives a 3D image.

14. The method of claim 13, wherein the 3D image corresponds to the frame of 3D image data.

15. The method of claim 1, wherein the near depth corresponds to about 1.96 diopters, and wherein the far depth corresponds to about 0.67 diopters.

16. The method of claim 7, wherein the near depth corresponds to about 1.96 diopters, and wherein the far depth corresponds to about 0.67 diopters.

17. A method for displaying a three dimensional ("3D") image in a blended mode, comprising:
rendering a frame of 3D image data;
analyzing the frame of 3D image data to generate depth data;
using the depth data to segment the 3D image data into:
i) at least one near frame of two dimensional ("2D") image data corresponding to a near depth, and ii) at least one far frame of 2D image data corresponding to a far depth that is farther than the near depth from a point of view; and
displaying the near and far frames at the near and far depths respectively, wherein the near depth corresponds to about 1.96 diopters and the far depth corresponds to about 0.67 diopters, and wherein the near and far frames are displayed simultaneously,
wherein using the depth data to segment the 3D image data into the near and far of frames of 2D image data comprises:
identifying a near only set of virtual objects/pixels having respective depths in a near depth range;
identifying a far only set of virtual objects/pixels having respective depths in a far depth range; and
identifying a near and far overlap set of virtual objects/pixels having respective depths in a middle depth range.

18. The method of claim 17, wherein using the depth data to segment the 3D image data into the near and far of frames of 2D image data further comprises:
adding the near only set of virtual objects/pixels to the near frame of 2D image data;
adding the far only set of virtual objects/pixels to the far frame of 2D image data;
performing a blending analysis on the near and far overlap set of virtual objects/pixels to identify a near overlap set of virtual objects/pixels and a far overlap set of virtual objects/pixels;
adding the near overlap set of virtual objects/pixels to the near frame of 2D image data; and
adding the far overlap set of virtual objects/pixels to the far frame of 2D image data.

19. The method of claim 18, wherein the blending analysis involves a linear interpolation, a non-linear interpolation, and/or a plurality of linear interpolations.

* * * * *